US011105101B2

(12) United States Patent
Stary et al.

(10) Patent No.: US 11,105,101 B2
(45) Date of Patent: Aug. 31, 2021

(54) CUSTOMIZABLE INNER FRAME AND LIGHTING FOR A MODULAR WALL OVERLAY SYSTEM

(71) Applicant: RAYVA International LLC, Valhalla, NY (US)

(72) Inventors: Paul Stary, Costa Mesa, CA (US); Theodore Kalomirakis, Long Island City, NY (US)

(73) Assignee: RAYVA International LLC, Valhalla, NY (US)

( * ) Notice: Subject to any disclaimer, the term of this patent is extended or adjusted under 35 U.S.C. 154(b) by 0 days.

(21) Appl. No.: 16/793,620

(22) Filed: Feb. 18, 2020

(65) Prior Publication Data

US 2021/0054991 A1 Feb. 25, 2021

Related U.S. Application Data

(60) Provisional application No. 62/888,751, filed on Aug. 19, 2019, provisional application No. 62/898,806, filed on Sep. 11, 2019.

(51) Int. Cl.
*E04C 2/38* (2006.01)
*E04F 13/00* (2006.01)
(Continued)

(52) U.S. Cl.
CPC ........ *E04F 13/0853* (2013.01); *E04B 2/7425* (2013.01); *E04C 2/38* (2013.01);
(Continued)

(58) Field of Classification Search
CPC ..... E04F 13/002; E04F 13/005; E04F 13/075; E04F 13/078; E04F 13/0807; E04F 13/081; E04F 13/0864; E04F 13/0867; E04F 13/0871; E04F 13/0883; E04F 13/30; E04F 13/25; E04F 2290/043; E04B 2/7407; E04B 2/7409; E04B 2/7448; E04B 2002/7468; E04B 2002/7479; E04C 2/38; E04C 2/388; E04C 2/42; E04C 2/421
(Continued)

(56) References Cited

U.S. PATENT DOCUMENTS 2,456,225 A 12/1948 Thomas
2,548,163 A 4/1951 Kaufmann
(Continued)

FOREIGN PATENT DOCUMENTS

DE 4035367 5/1992
DE 202009012638 12/2009
(Continued)

*Primary Examiner* — Ryan D Kwiecinski
(74) *Attorney, Agent, or Firm* — Leason Ellis LLP

(57) ABSTRACT

A modular wall overlay system for installation on a support surface includes an outer frame having a pair of opposing ends and a pair of opposing sides and a customizable inner frame that is coupled to the outer frame. The inner frame includes a plurality of transverse supports that extend between the opposing sides and a plurality of longitudinal supports that extend between the opposing ends. The longitudinal supports and the transverse supports lie in a common plane defined within the outer frame. The system further includes a cover that is securely retained on the outer frame.

23 Claims, 30 Drawing Sheets

(51) Int. Cl.

| | | |
|---|---|---|
| *E04F 13/08* | (2006.01) | |
| *E06B 3/964* | (2006.01) | |
| *F16B 5/00* | (2006.01) | |
| *E04F 13/074* | (2006.01) | |
| *E04F 13/075* | (2006.01) | |
| *E04F 13/078* | (2006.01) | |
| *E04F 13/09* | (2006.01) | |
| *E04B 2/74* | (2006.01) | |
| *E04C 5/12* | (2006.01) | |
| *E04C 5/16* | (2006.01) | |
| *E04F 13/07* | (2006.01) | |
| *E04F 13/073* | (2006.01) | |
| *F21V 21/04* | (2006.01) | |
| *F21V 21/096* | (2006.01) | |
| *F21V 21/116* | (2006.01) | |
| *F16G 11/12* | (2006.01) | |
| *H04R 1/02* | (2006.01) | |
| *F21V 23/00* | (2015.01) | |

(52) U.S. Cl.
CPC .............. *E04C 5/122* (2013.01); *E04C 5/162* (2013.01); *E04F 13/00* (2013.01); *E04F 13/005* (2013.01); *E04F 13/07* (2013.01); *E04F 13/073* (2013.01); *E04F 13/074* (2013.01); *E04F 13/075* (2013.01); *E04F 13/078* (2013.01); *E04F 13/0812* (2013.01); *E04F 13/0867* (2013.01); *E04F 13/09* (2013.01); *E06B 3/9644* (2013.01); *F16B 5/0004* (2013.01); *F21V 21/041* (2013.01); *F21V 21/096* (2013.01); *F21V 21/116* (2013.01); *E04C 5/16* (2013.01); *F16G 11/12* (2013.01); *F21V 23/002* (2013.01); *H04R 1/025* (2013.01)

(58) Field of Classification Search
USPC ...... 52/222, 239, 511, DIG. 4; 181/284, 291
See application file for complete search history.

(56) References Cited

U.S. PATENT DOCUMENTS

| | | | |
|---|---|---|---|
| 2,702,596 A | 2/1955 | Morrow | |
| 2,840,200 A * | 6/1958 | Wong | E04B 9/122 |
| | | | 403/347 |
| 2,891,603 A | 6/1959 | Lilienfeld | |
| 3,797,194 A | 3/1974 | Ekstein | |
| 3,908,293 A | 9/1975 | Newman | |
| 4,006,771 A | 2/1977 | Spurkel | |
| 4,014,377 A | 3/1977 | Kochanowski | |
| 4,143,501 A | 3/1979 | Tuttle | |
| 4,161,977 A | 7/1979 | Baslow | |
| 4,428,135 A | 1/1984 | Sobel | |
| 4,535,580 A * | 8/1985 | Shirey | E04B 9/10 |
| | | | 52/506.06 |
| 4,570,406 A | 2/1986 | DiFazio | |
| 4,653,562 A | 3/1987 | Moss et al. | |
| 4,691,486 A | 9/1987 | Niekrasz | |
| 4,841,696 A | 6/1989 | Miller | |
| 4,968,105 A | 11/1990 | Schaars | |
| 4,986,389 A * | 1/1991 | Halligan, Sr. | E04G 21/28 |
| | | | 182/138 |
| 5,067,543 A | 11/1991 | Bove | |
| 5,177,917 A | 1/1993 | del Castillo Von Haucke | |
| 5,473,853 A | 12/1995 | Guillemet | |
| 5,667,002 A * | 9/1997 | Neustadt | B65D 88/14 |
| | | | 160/368.1 |
| 5,921,051 A | 7/1999 | Hope | |
| 6,094,879 A | 8/2000 | Dickeduisberg | |
| 6,422,292 B1 | 7/2002 | Berry | |
| 8,028,489 B1 | 10/2011 | Lawrence | |
| 8,074,411 B1 | 12/2011 | Anderson | |
| 9,580,912 B1 | 2/2017 | Harkins | |
| 9,745,748 B2 * | 8/2017 | Bergman | E04B 9/0428 |
| 9,845,598 B1 | 12/2017 | Hsu | |
| 10,094,164 B2 | 10/2018 | Massey | |
| 10,132,078 B2 | 11/2018 | Parr | |
| 10,174,507 B1 | 1/2019 | Henbid | |
| 10,273,696 B2 * | 4/2019 | Scherrer | E04B 9/303 |
| 10,854,119 B2 * | 12/2020 | Entwistle | G09F 9/30 |
| 2004/0200167 A1 | 10/2004 | Isaac | |
| 2005/0194029 A1 | 9/2005 | Goldwitz | |
| 2007/0125016 A1 | 6/2007 | Yu | |
| 2007/0283656 A1 | 12/2007 | Anderson | |
| 2008/0034702 A1 | 2/2008 | Garries | |
| 2008/0190876 A1 | 8/2008 | Janson et al. | |
| 2009/0090076 A1 | 4/2009 | Abusada | |
| 2010/0116445 A1 | 5/2010 | Morris | |
| 2010/0126091 A1 * | 5/2010 | Meyer | E04B 9/303 |
| | | | 52/222 |
| 2010/0202824 A1 | 8/2010 | Subra | |
| 2010/0206496 A1 | 8/2010 | Ninaber | |
| 2011/0194886 A1 | 8/2011 | Wu | |
| 2011/0221225 A1 | 9/2011 | Erdahl | |
| 2012/0012542 A1 | 1/2012 | Brown et al. | |
| 2012/0285637 A1 | 11/2012 | Kasuya | |
| 2013/0019558 A1 | 1/2013 | Tseng | |
| 2014/0318049 A1 | 10/2014 | Paquet | |
| 2014/0345174 A1 | 11/2014 | Weight | |
| 2016/0066715 A1 | 3/2016 | Hannula | |
| 2016/0280533 A1 | 9/2016 | Tsuchiyama | |
| 2017/0133982 A1 | 5/2017 | Weinshenker | |
| 2017/0151772 A1 | 6/2017 | Spiro | |
| 2017/0218680 A1 | 8/2017 | Isaacs | |
| 2017/0268228 A1 * | 9/2017 | Bergman | E04B 9/303 |

FOREIGN PATENT DOCUMENTS

| | | | |
|---|---|---|---|
| FR | 3020388 | 10/2015 | |
| FR | 3020388 A1 * | 10/2015 | ........... E04F 13/005 |
| FR | 3057288 | 4/2018 | |
| GB | 2275938 | 9/1994 | |
| JP | 2000-43503 | 2/2000 | |
| KR | 20090066716 | 6/2009 | |
| KR | 20090066716 A * | 6/2009 | |
| KR | 20150116373 | 10/2015 | |
| KR | 20150116373 A * | 10/2015 | ............... E04G 9/04 |
| WO | WO 9958780 | 11/1999 | |
| WO | WO 2006/063991 | 6/2006 | |
| WO | WO 2018211313 | 11/2018 | |
| WO | WO-2018211313 A1 * | 11/2018 | ........... E04B 9/0428 |

\* cited by examiner

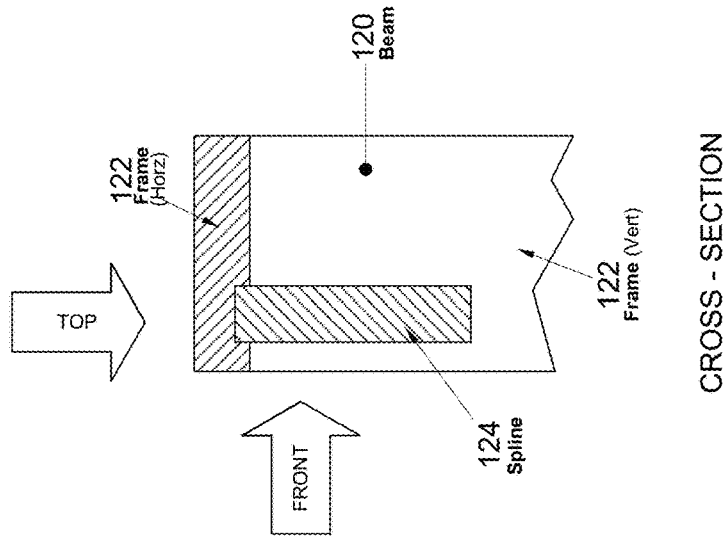
Fig. 3C
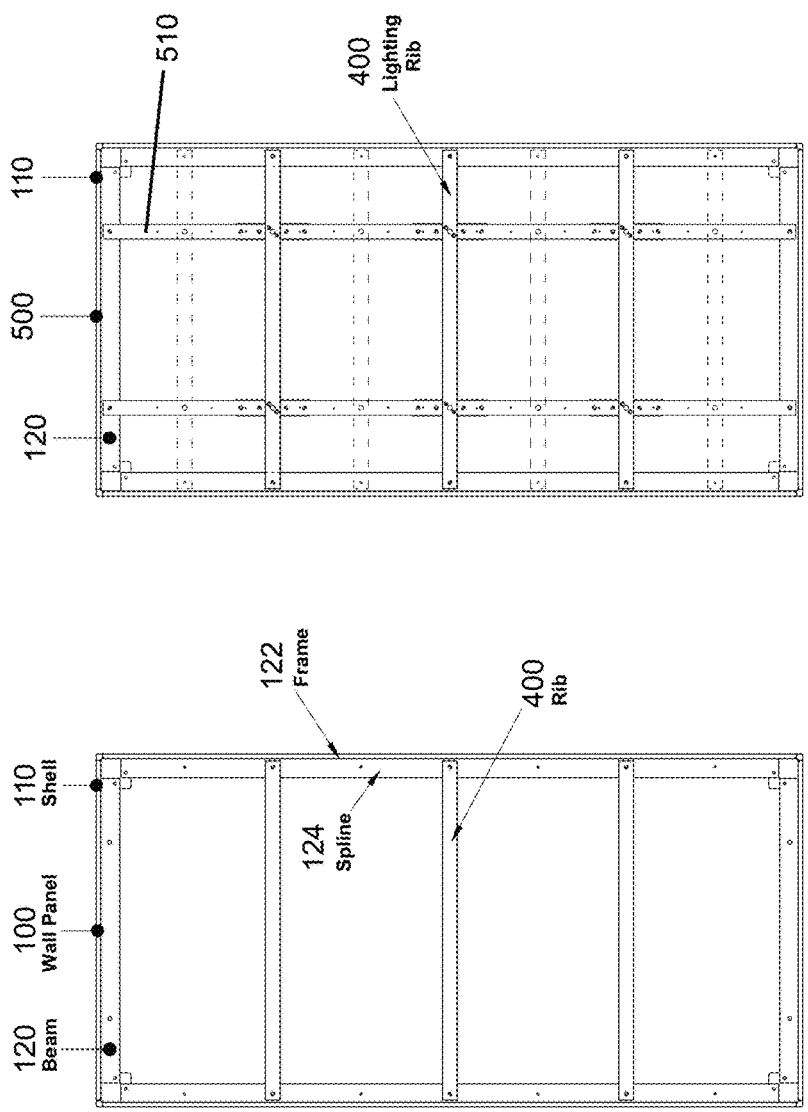
Fig. 3B
Fig. 3A

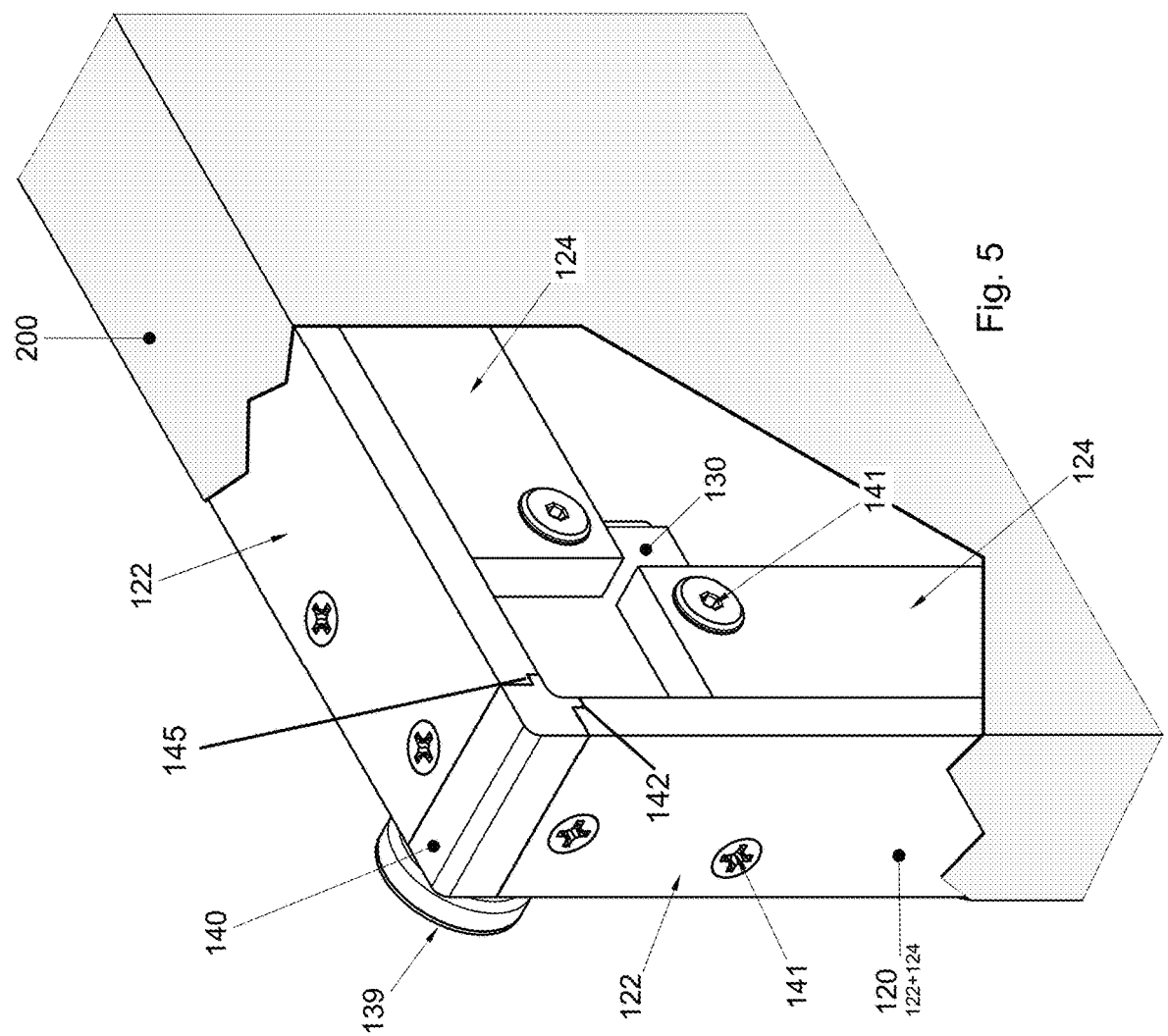
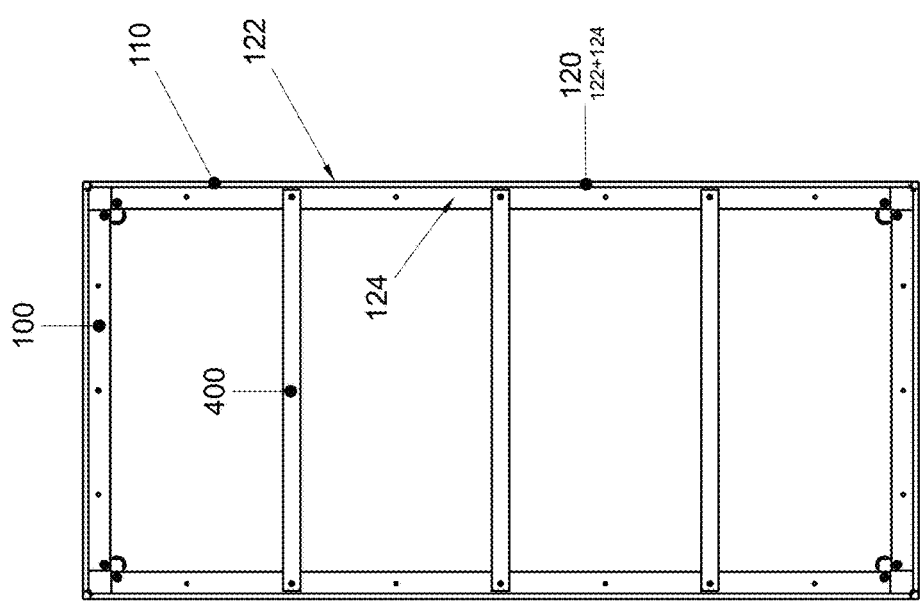

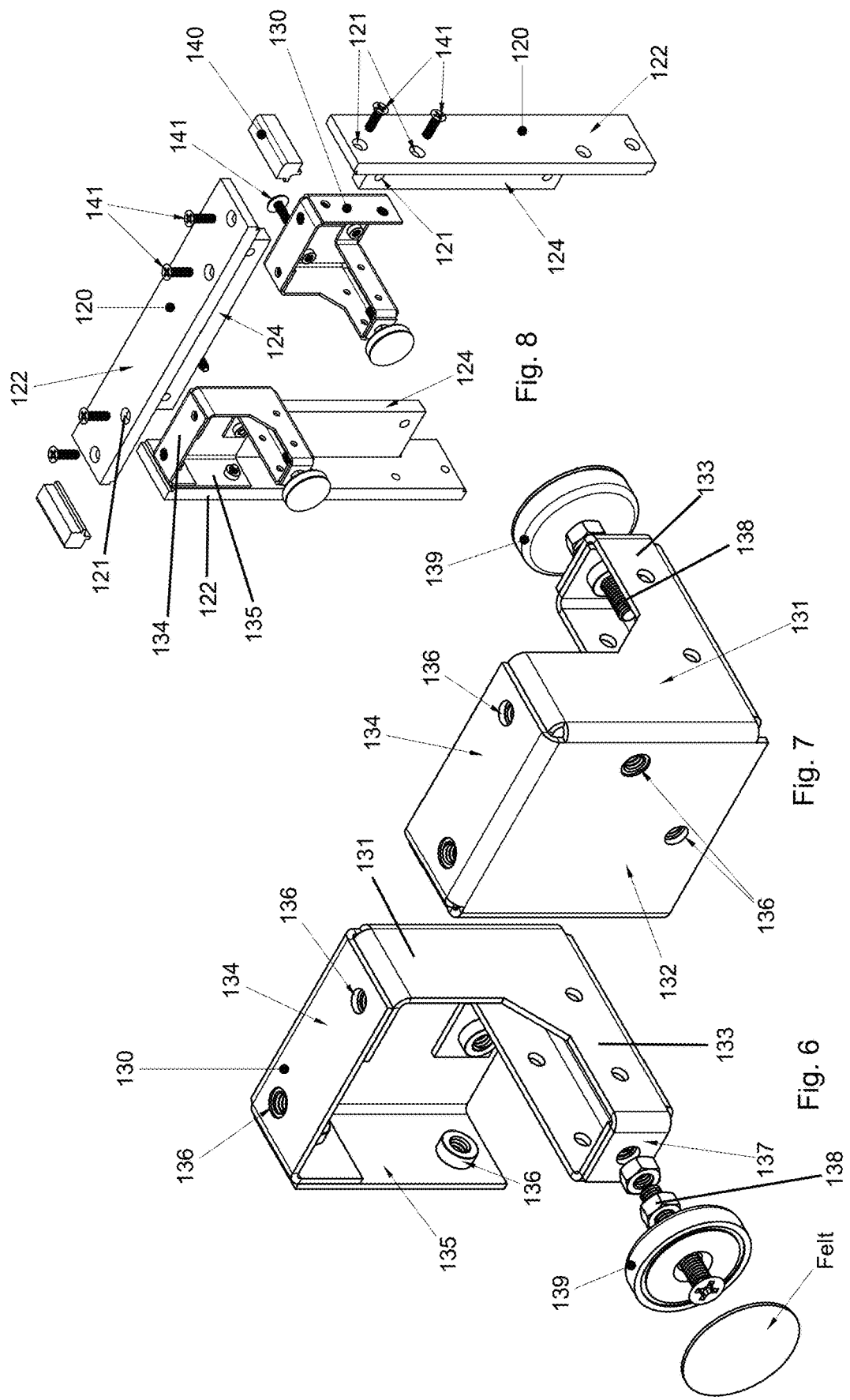

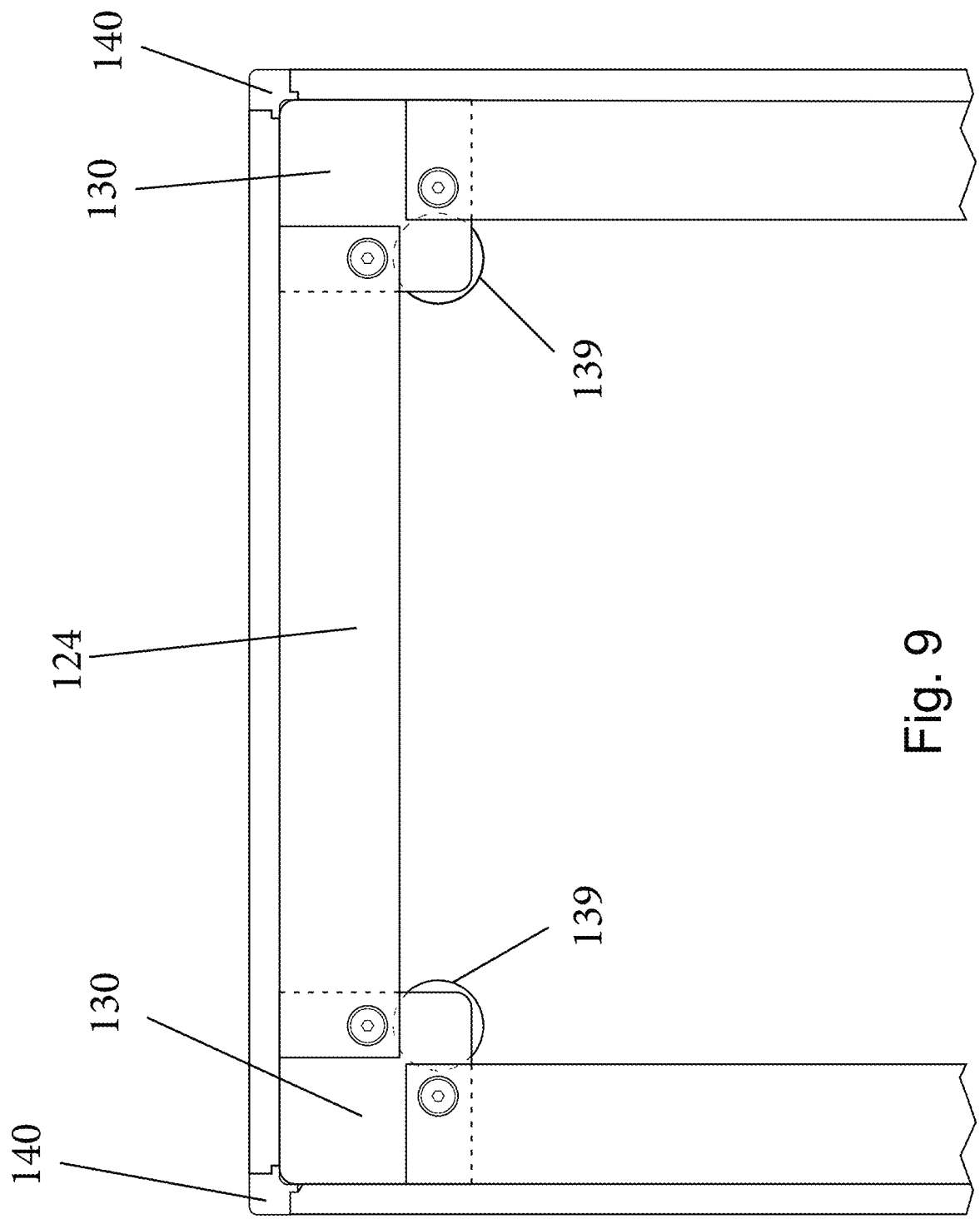

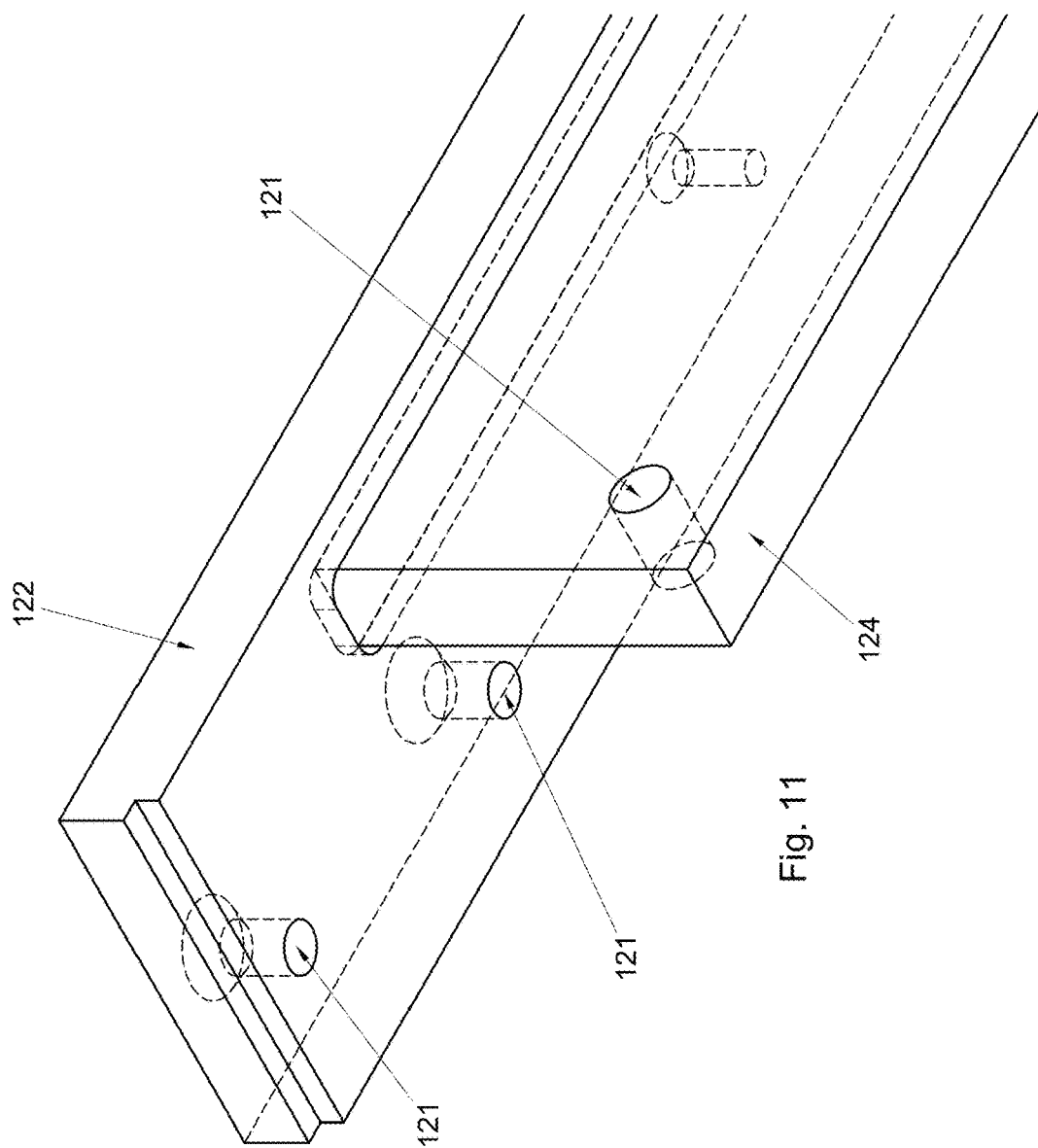
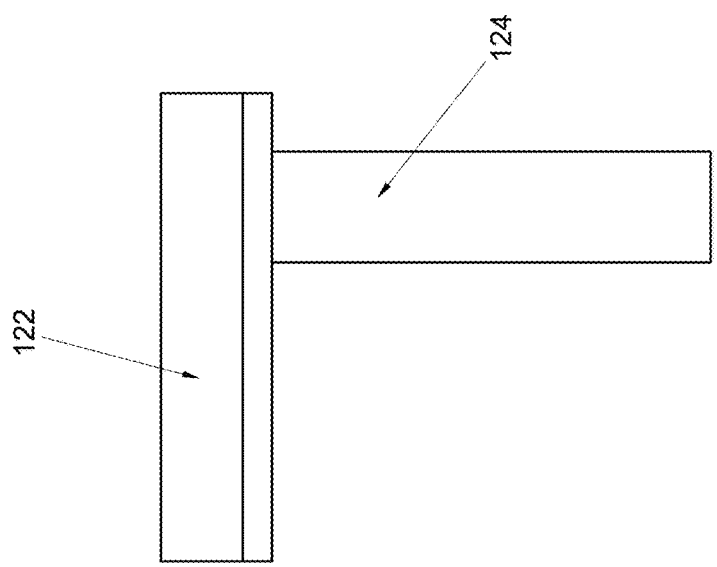
Fig. 11
Fig. 10

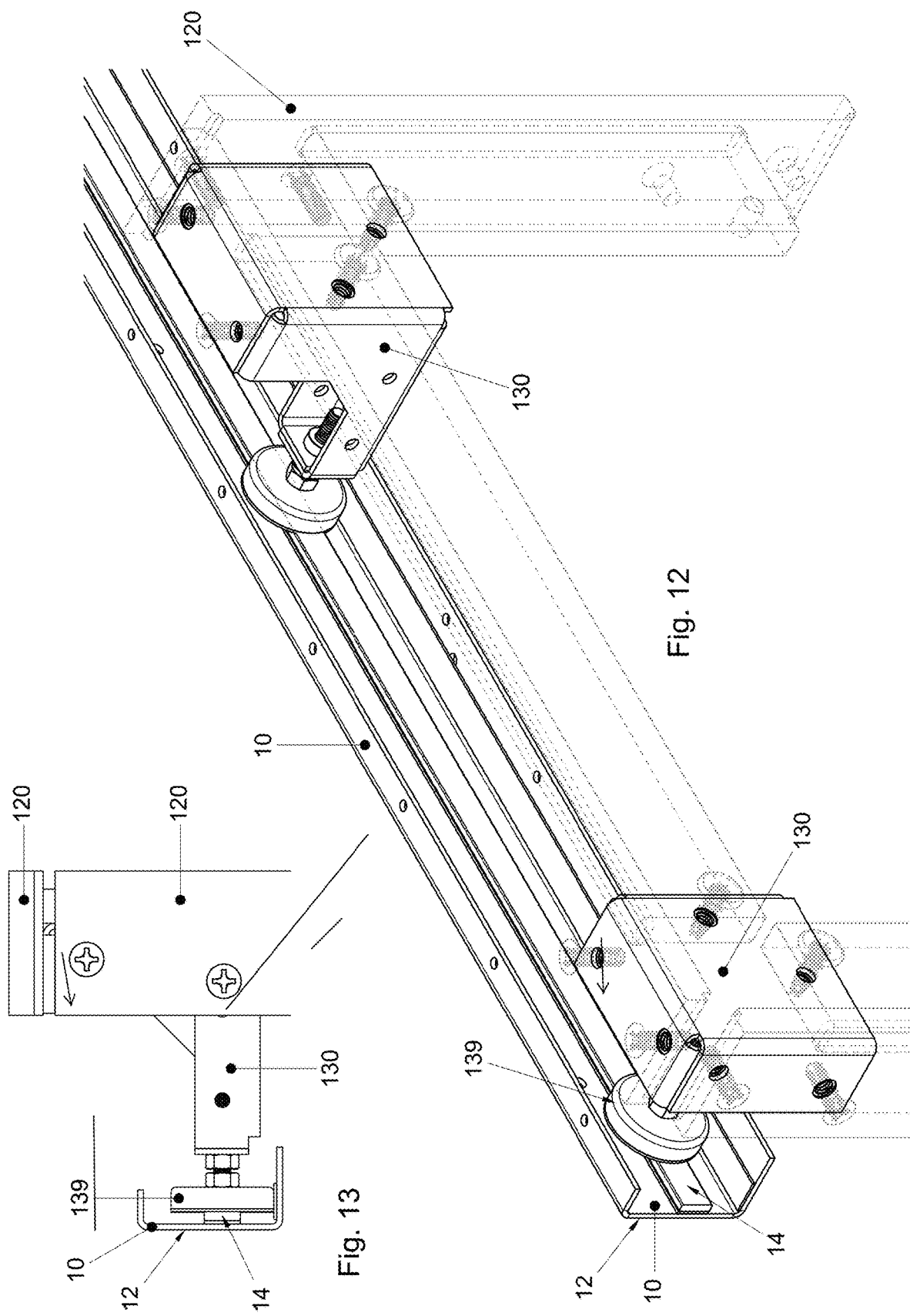

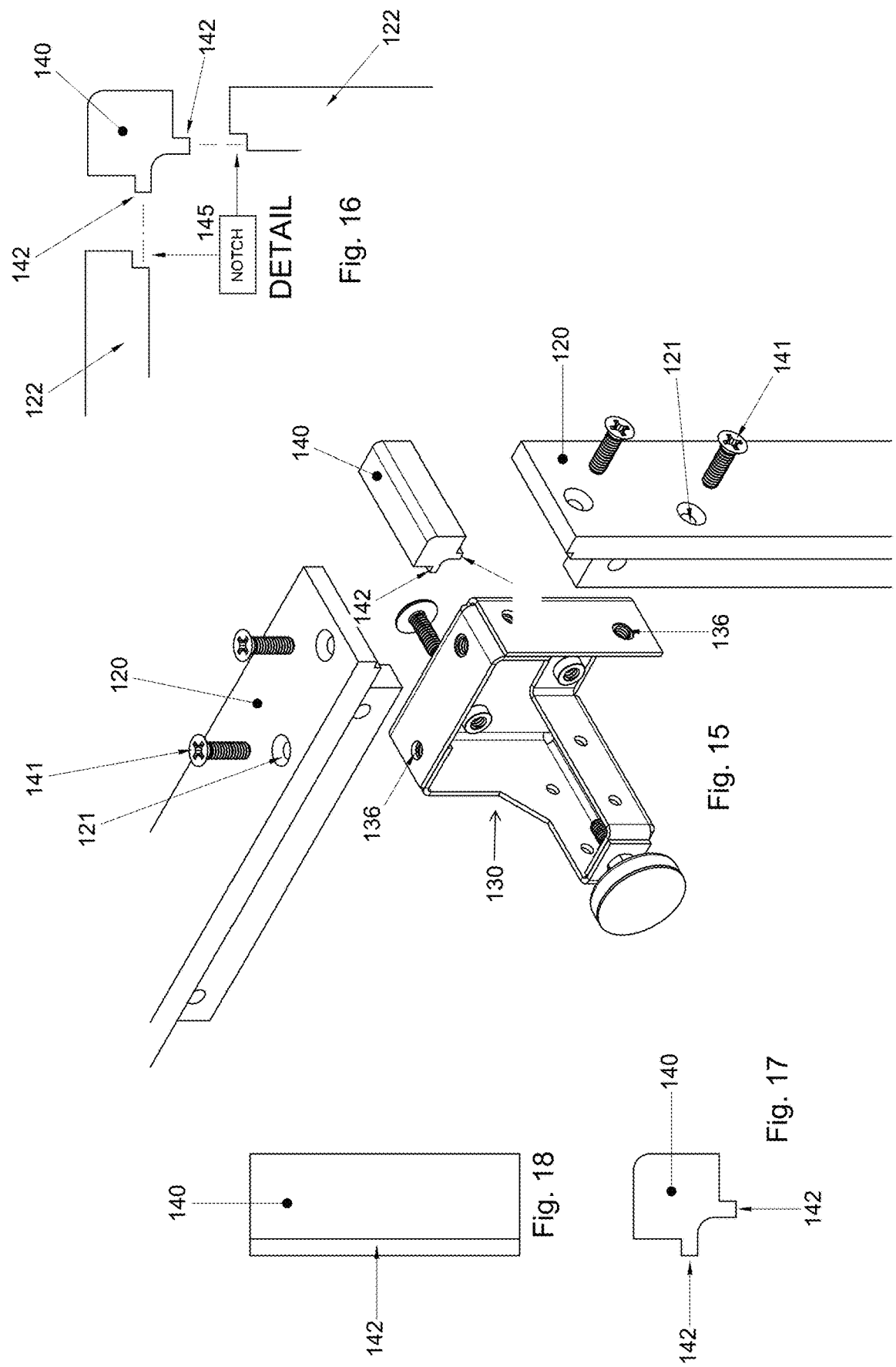

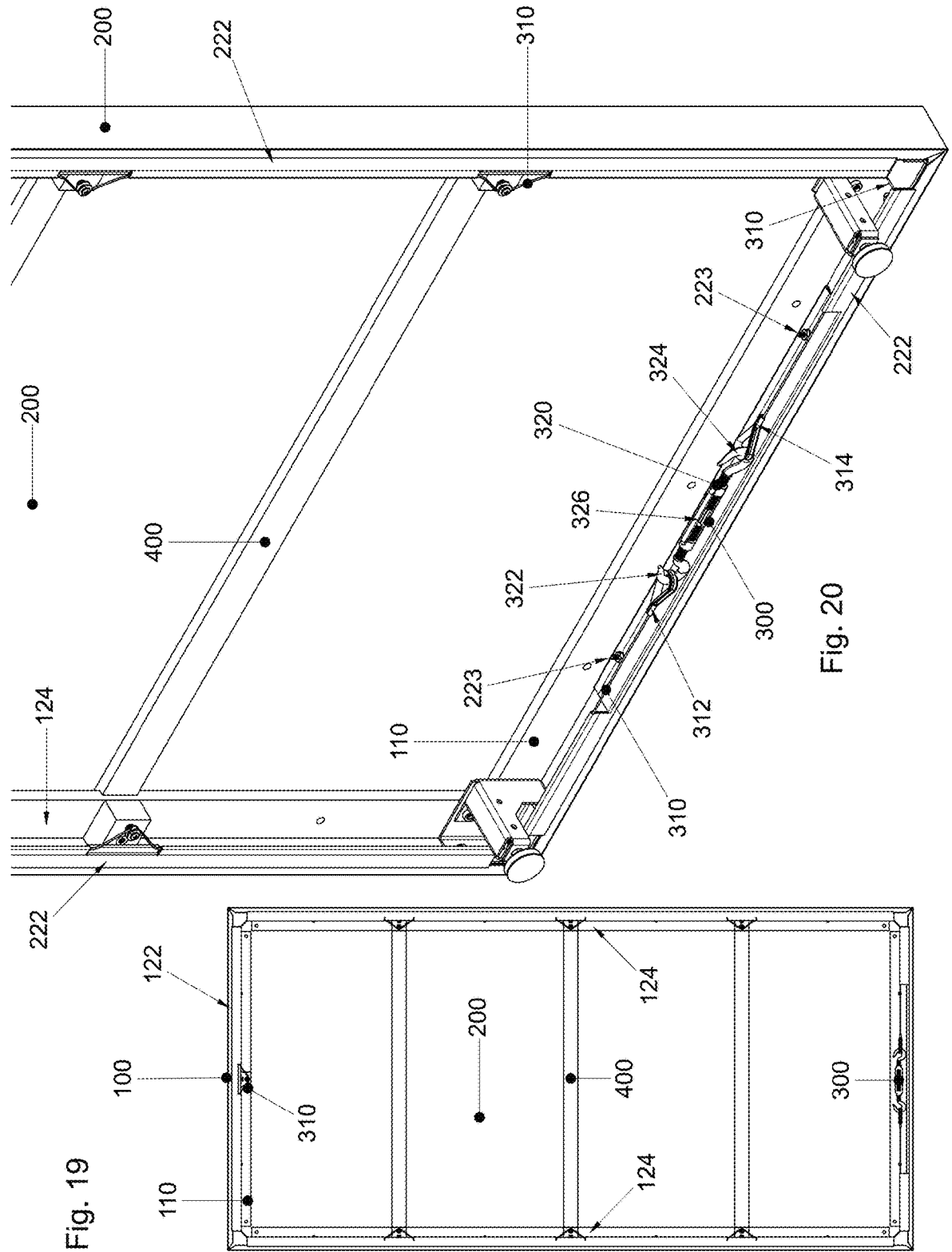

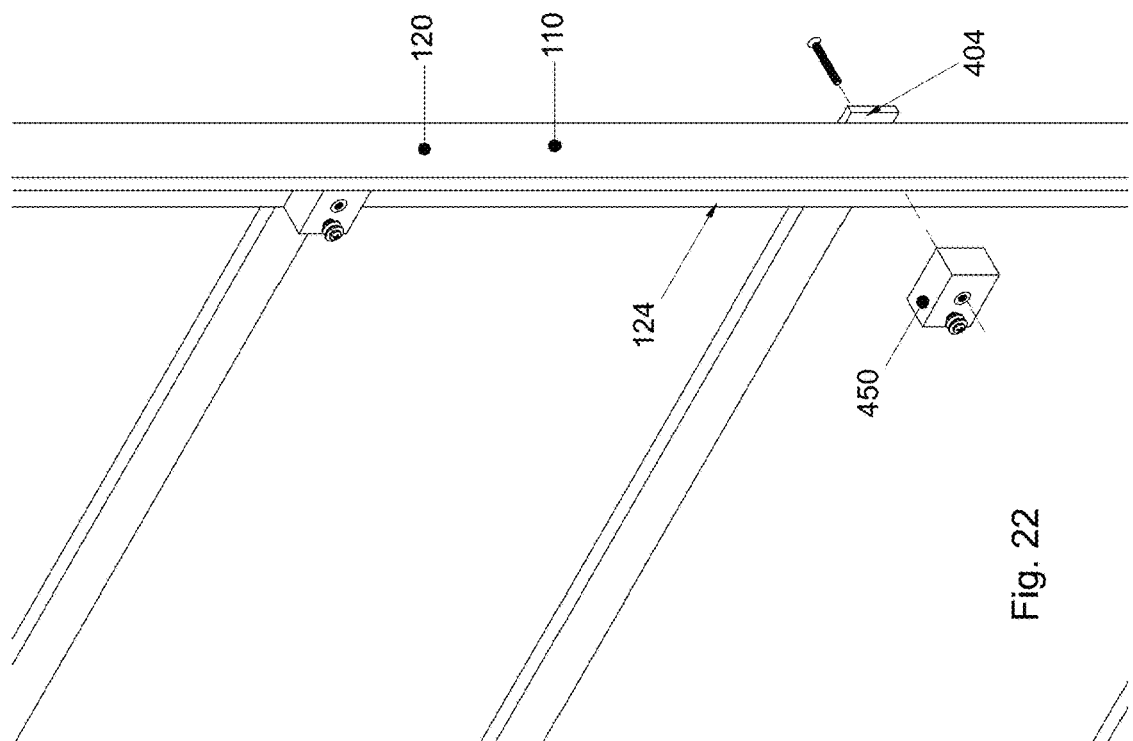
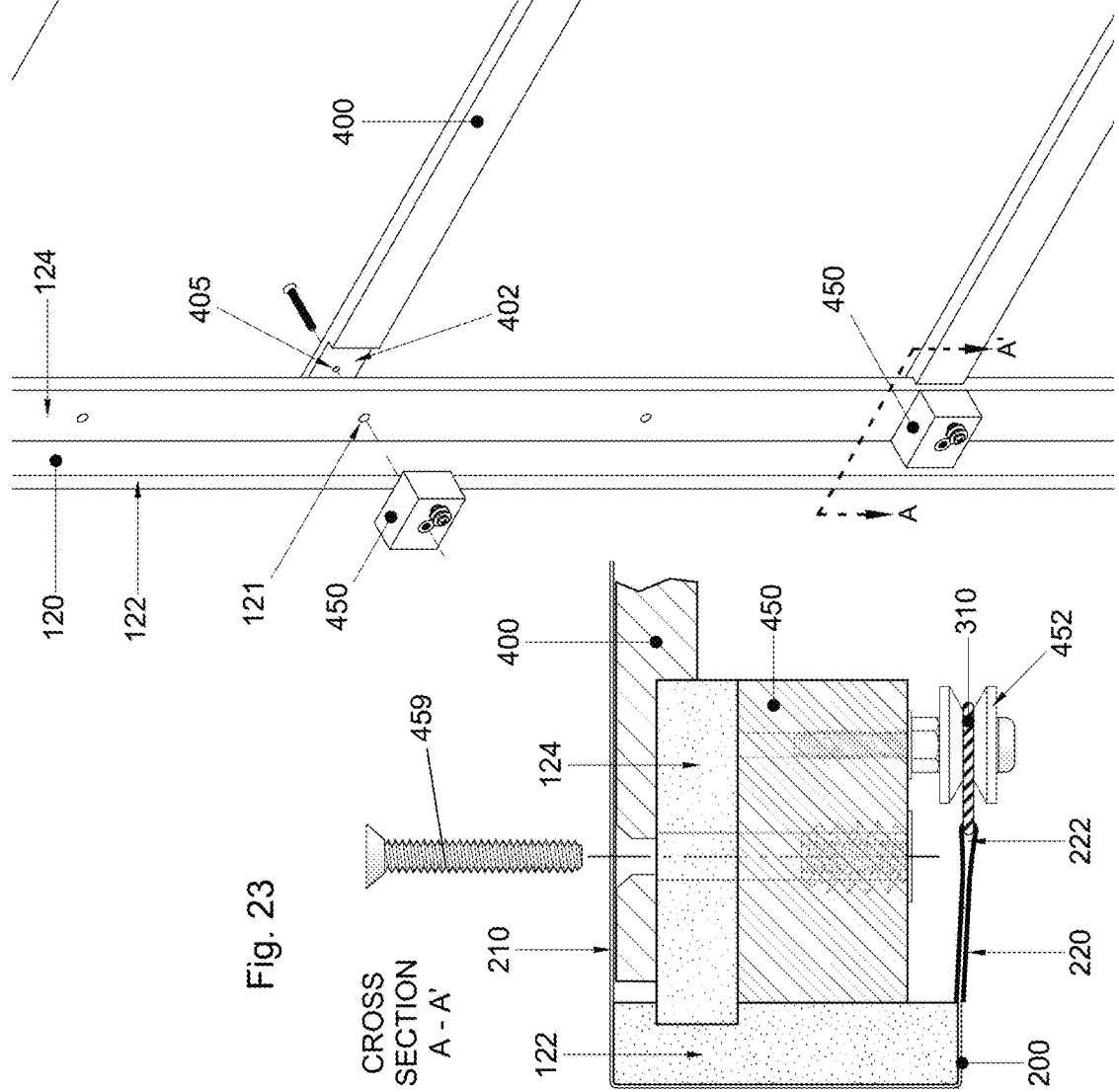
Fig. 22
Fig. 23
CROSS SECTION A-A'

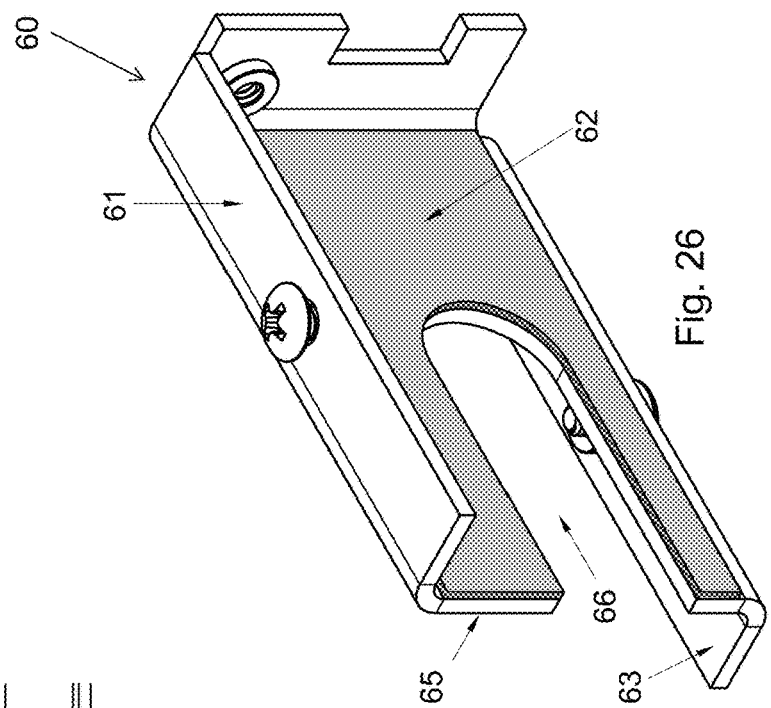
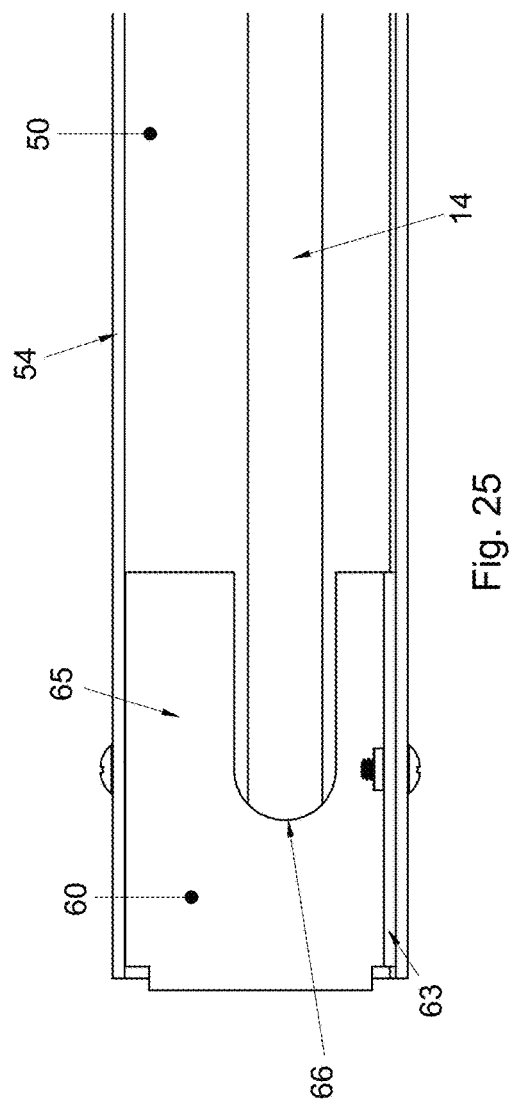

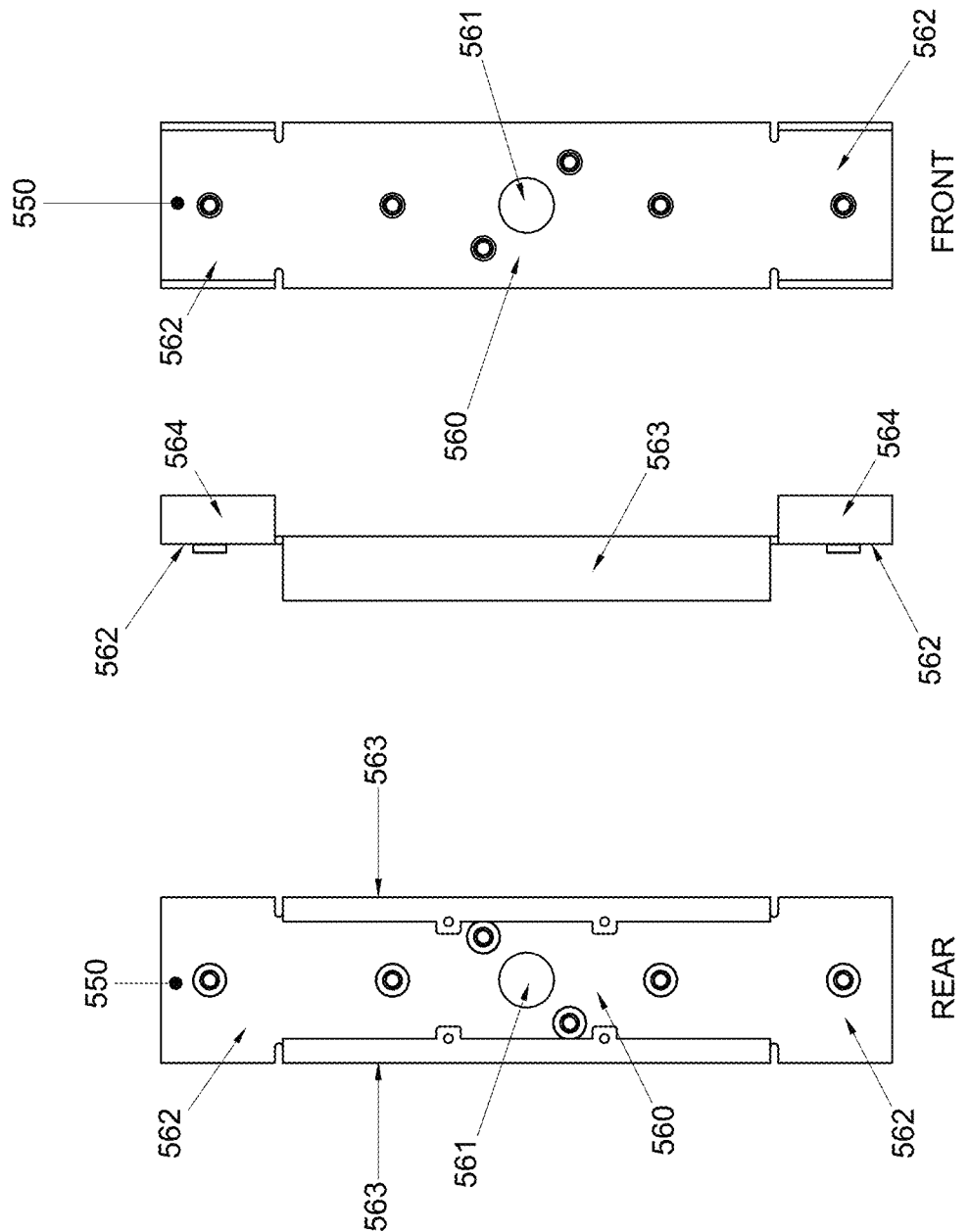

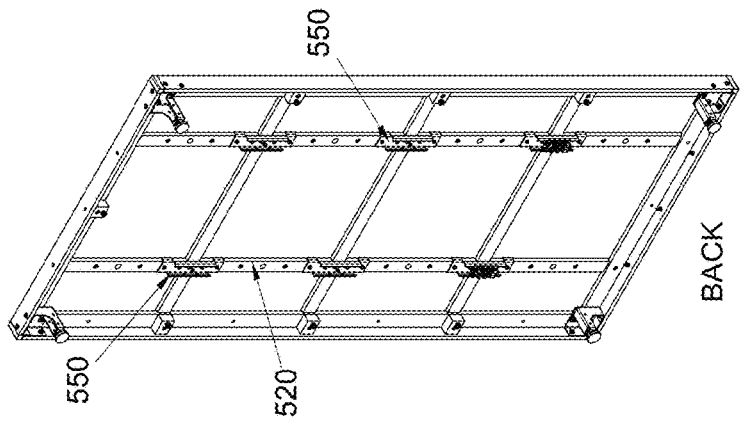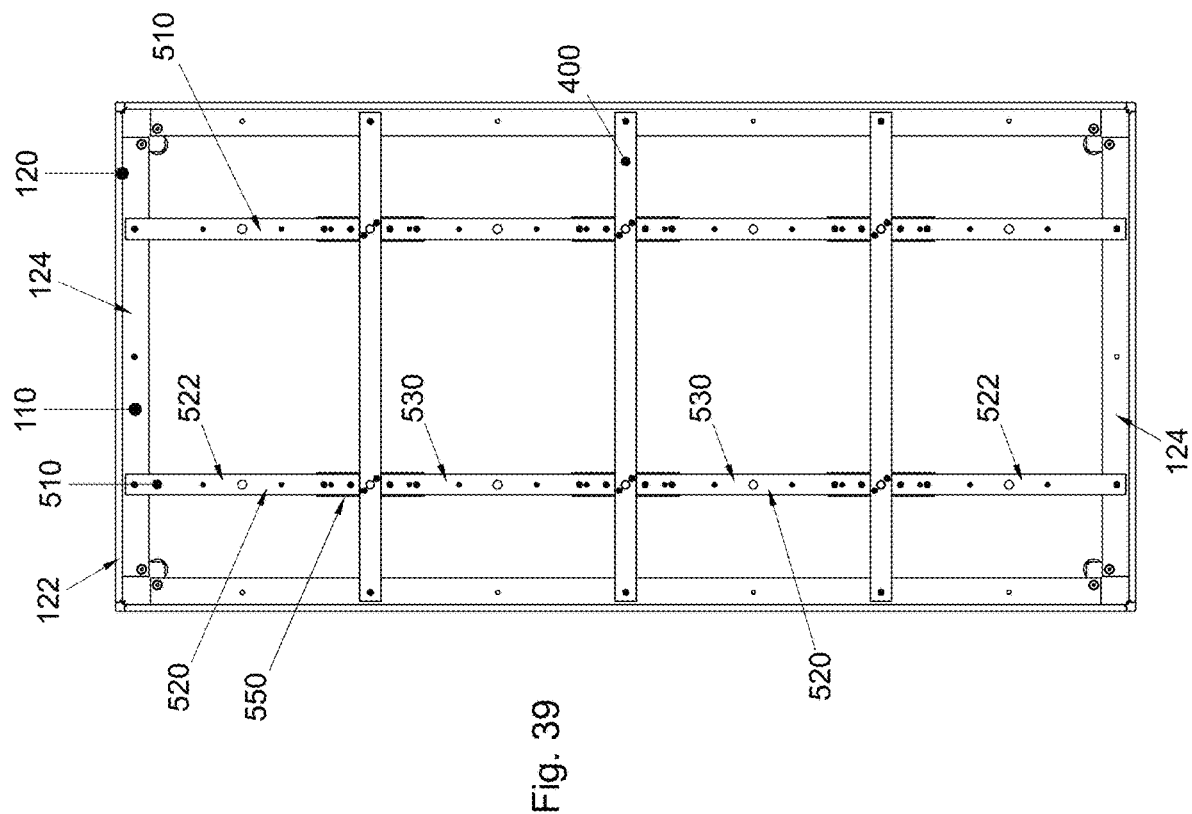

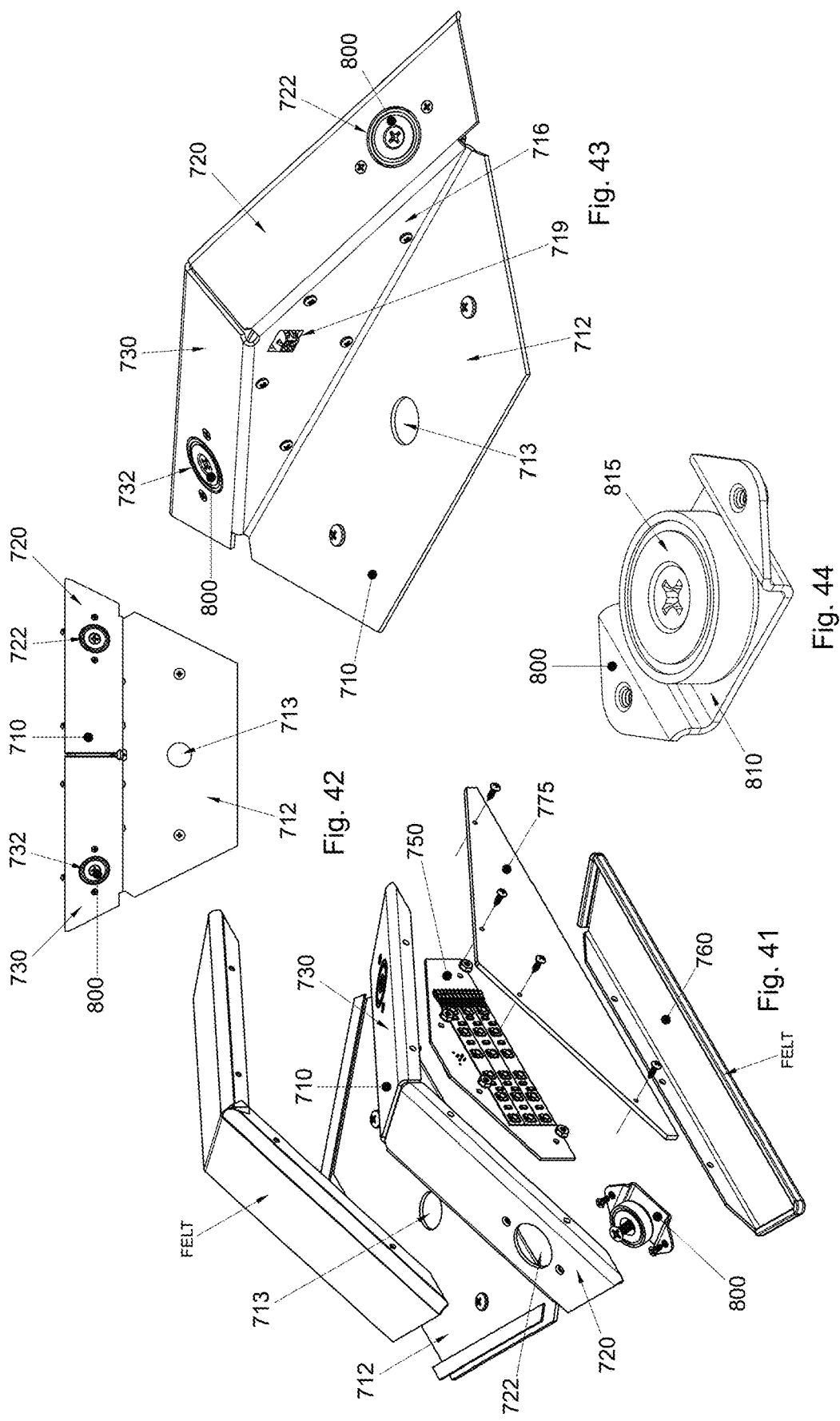

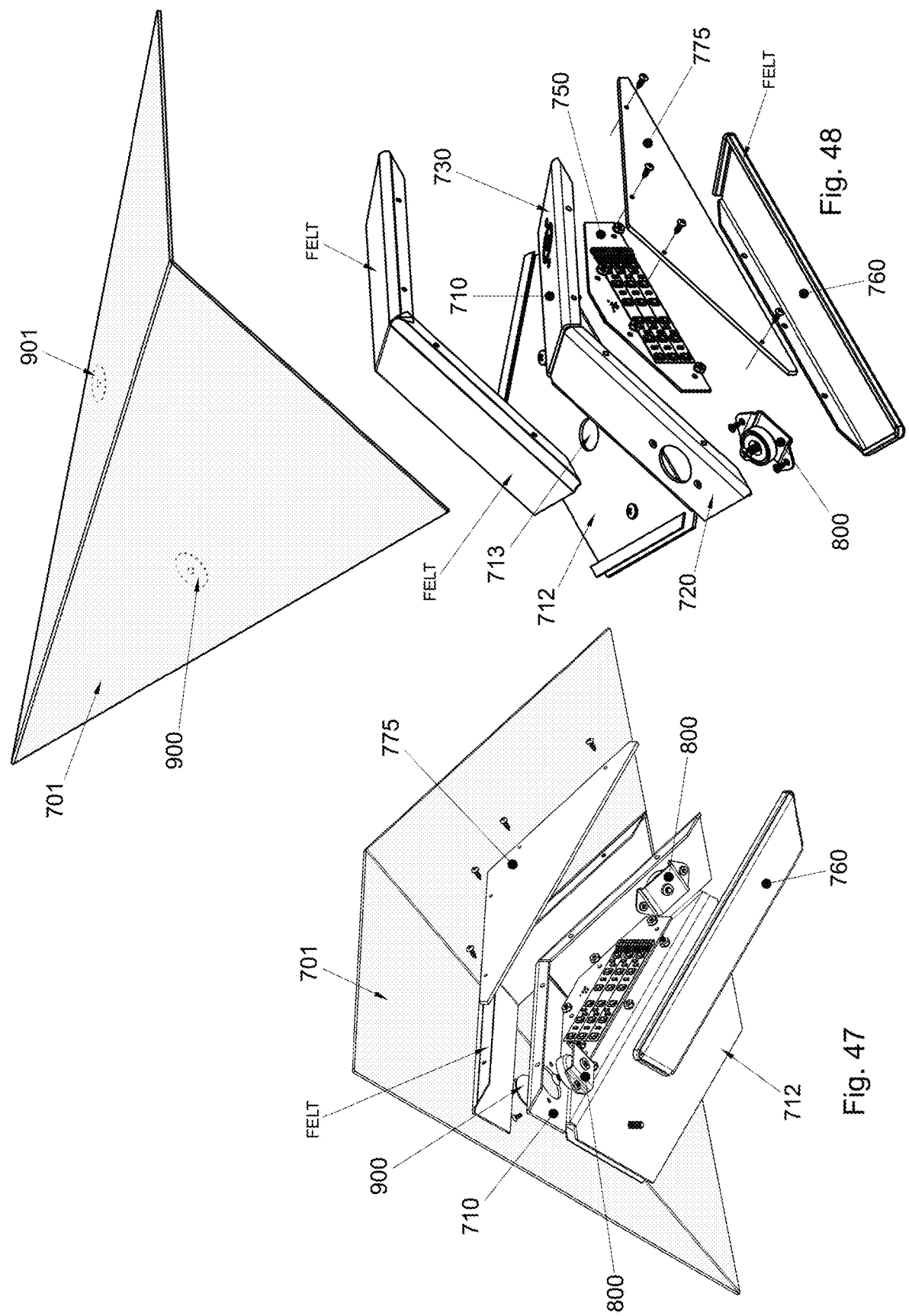

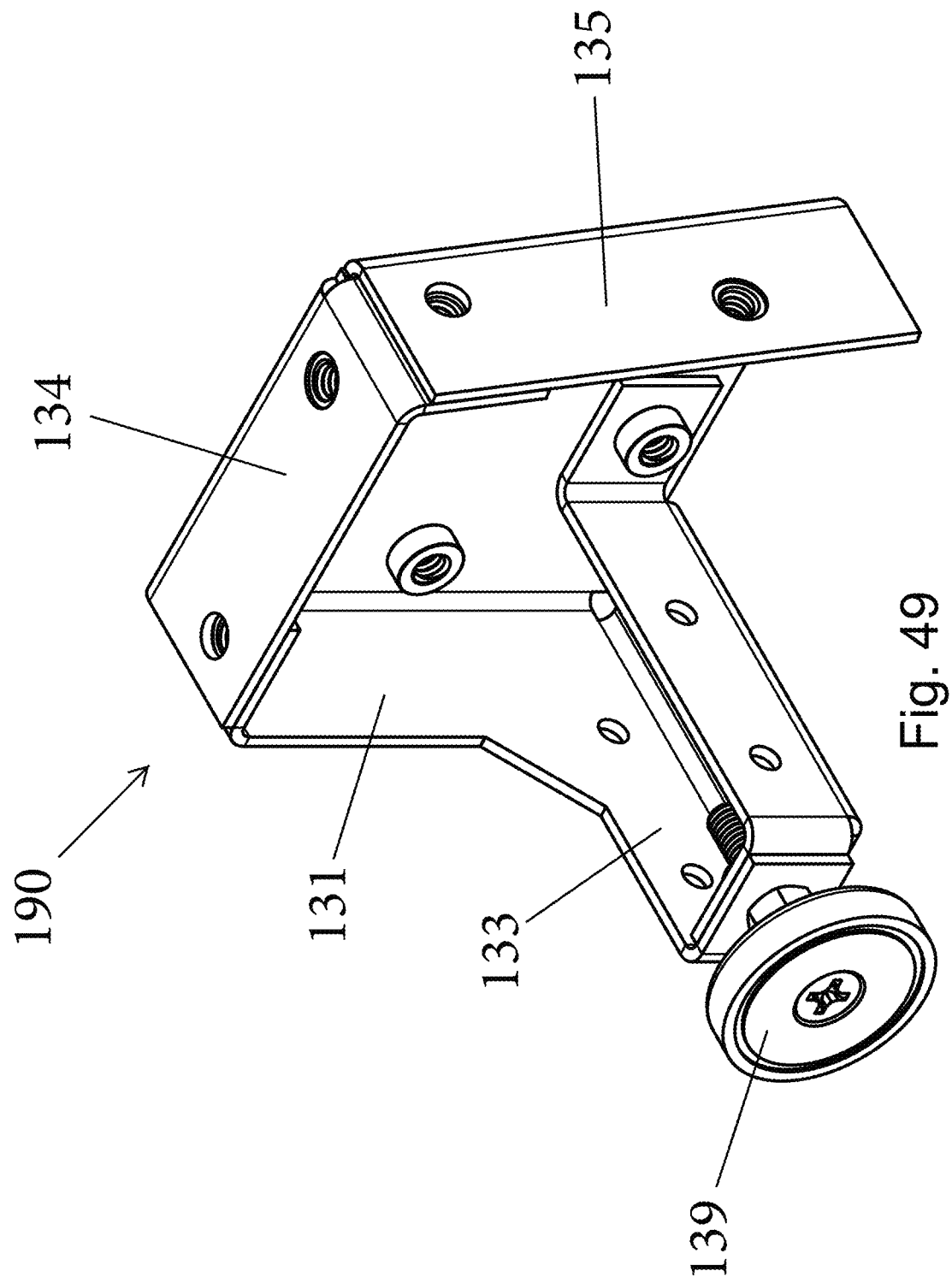

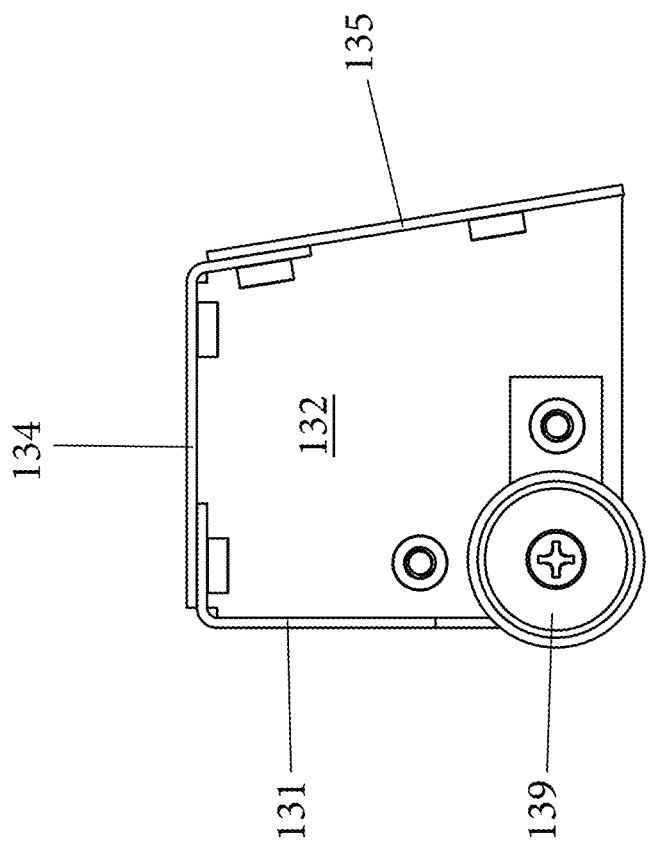

CUSTOMIZABLE INNER FRAME AND LIGHTING FOR A MODULAR WALL OVERLAY SYSTEM

CROSS-REFERENCE TO RELATED APPLICATIONS

The present application claims the benefit of and priority to U.S. patent application No. 62/888,751, filed Aug. 19, 2019, and U.S. patent application No. 62/898,806, filed Sep. 11, 2019, each of which is hereby incorporated by reference in its entirety.

TECHNICAL FIELD

The present invention is directed to a modular wall overlay system for placement on a support surface that can be wall or ceiling in a room, such as an entertainment room (e.g., a home theater), and in particular, to a modular wall overlay system that is configured to be detachably coupled to the support surface, such as a wall or ceiling, and is further configured to mate with and conceal accessories, such as an integrated lighting system, acoustical treatment panels, loudspeaker systems and integrated electronics to provide power, signal distribution, lighting control and interface to remote devices, as well as, providing for custom personalization in the dimensions and appearance of the wall overlay system.

BACKGROUND

In more recent years, home entertainment design has become more detailed and complex as there are more and more consumers who want a home theater that provides a theater-like experience in the comfort of their home. A home theater can be as simple as a few AV components in a living room or as complex as a custom designed home theater including a high-resolution video projector, surround-sound speaker system, theater seating and other amenities.

At its core, a home theater system should provide a high-quality video experience and an immersive audio experience that breathes life into movies, sporting events and other video content played on the display, e.g., screen, of the home theater.

The main AV devices (components) of the home theater are a video display that produces rich, high-resolution images and a speaker system that immerses the audience in sound that comes at the audience from all directions. Traditional video systems consisted of a projection system and a very large screen, while the more recent trend is to employ large sized flat-panel television (flat-panel video display). Two more recent trends in the television world are: 1) smart TVs that connect to your home network and stream content services like Netflix, Hulu, and Spotify; and 2) Ultra HD or 4K TV, which offers four times the resolution of 1080p and can include advanced technologies like High Dynamic Range and a Wide Color Gamut.

The creation of a great home theater goes far beyond the selection of AV equipment since there are many considerations that must be taken into account for home theater room design. For example, to bring out the very best in one's audio system, many people apply acoustic treatments onto the walls and ceiling to help reduce reflections and correct other anomalies caused by the size and shape of the room, as well as the materials used to construct the room. Many professional installers offer advanced acoustic calibration, in which they measure the system's audio characteristics and place acoustic products (diffusers, absorbers, bass traps) exactly where they're needed in the room.

In addition, the number of design elements and accessories that can be incorporated into a dedicated home theater space is endless. For example, the type of seating and the location of the seats influences the overall comfort and appeal of the home theater. Another aspect of the dedicated home theater space is lighting and what's more theater-like than a lighting system that automatically dims when you command the movie to start by using a touch-screen remote control or the like. Additional lighting, such as track lights overhead and colored LED wall lighting, provides additional ambience.

There is a need and desire for a modular wall overlay system to hide the acoustical treatment panels, speakers, lighting controls and all the wiring to support these elements, a system, that is easy to install and provides all the features sought after in today's specialized interior spaces, such as home theaters, corporate board rooms and wellness rooms.

SUMMARY

The present disclosure is directed to modular wall overlay (panel) systems that are configured for detachable coupling to a support surface, such as a wall or ceiling found in a room, such as a home theater space, conference or board room, or any type of room for that matter.

The Problem with Current Room Design

A "room" is defined as "part or division of a building enclosed by walls, floor, and ceiling". The key word here is "enclosed" or enclosure. Occupants of a room are inside of an enclosure where sounds from speakers or people talking are dramatically affected by the reflections between surfaces within that enclosure. Imagine if all the walls, ceiling and floor were covered entirely in mirrors! What would it feel like to spend time in such a room? While you can't see the sound, it is just as chaotic as the visuals in the example above. You don't SEE the problem, you HEAR it!

Acoustical Treatment

Rooms where people get together for entertainment, conversation or just to be in silence, all benefit from acoustical treatments applied to the walls and ceiling. These treatments are usually 1"-2" thick fibrous panels of various types, often covered with acoustically transparent fabric, which are applied to the room surfaces using scientific rules. These panels mitigate and control the sound reflections to remove the audible chaos.

But the application of these panels has a number of associated problems.

The panels are usually ugly.

Mounting them requires lots of holes in the walls and ceiling.

Other elements in the room, such as speakers, lighting and artwork, are hard to integrate with the acoustical solution.

Wiring for speakers and lighting need to be run behind the walls if you don't want to look at them.

Hiding the Parts

One way to deal with the treating a room is to use acoustically transparent, fabric-covered frames that are mounted to the walls and ceiling. These hide all the acoustical treatment panels, speakers and wiring behind them and facilitate the benefits of acoustical treatments without destroying the look of the room. In fact, with stylish panel construction, the panels become a design element themselves by offering attractive fabrics, places to mount art panels and even adding custom LED lightning elements onto the panels. As described herein, the modular wall overlay systems disclosed herein adopt this approach.

A number of companies offer complete room acoustic solutions with various panel designs and parts that are shipped to the job site, complete.

Panels are large, on the order of a sheet of plywood.

Large panels require crating and trucking for delivery.

Fabric is pre-applied and permanently attached to the frame so there is no option to replace it if defective or damaged.

The parts fill the client's garage while the installation proceeds over days, weeks or even months.

The present modular wall overlay system offers a complete turn-key solution for improving any size or type of room. The present systems can provide acoustical treatments, on-wall loudspeakers, lighting controls, and the wiring and cables to support everything, all hidden behind beautiful, themed wall panels.

Furthermore, as described herein, these wall overlays use a unique modular design that enables the present system to ship all parts as a kit, including the components to make the large wall panels, for final assembly on-site. Everything is shippable by a commercial courier.

Parts can be shipped to the job or to the installer's warehouse where only the parts required for the day's work need to be taken to the job site. However, since installation on takes a few days at most, and there are no large crates to deal with, it doesn't really matter where the parts are stored.

Fabric covers are pre-sewn to perfectly fit each panel size, with a patented cable retention system that enables the installer to stretch the fabric over the frame in just a few minutes after it's assembled.

Wall and ceiling panels are magnetically attached using the provided exemplary 2 ft, 3 ft, 4 ft and 6 ft mounting channels that run across the room surfaces at the top and bottom of the panels. These are secured to the wall with a few drywall anchors.

Thus, the entire system can be removed leaving minimal small holes to fill and patch.

More than Wall Panels

As described herein, the present system optionally offers unique lighting elements that can be mounted to the front face of the wall panels, supported by a grid system that runs just behind the fabric. This same grid also supports various size art panels that can be magnetically mounted onto the face of the panels in a variety of locations. Since the art panels are magnetically attached, they can be easily removed, rearranged or changed. Businesses can use these for branding or product showcases, changed for each meeting. This grid also enables mounting the acoustical treatments, loudspeakers, electronics, lighting controls and any other devices that would otherwise need to be mounted to the walls and ceiling, onto the back side of the grid. This virtually eliminates the need any holes in the walls other than two or three small holes for each mounting channel. Since the entire panel is magnetically attracted to the mounting channels, it can easily be removed with a tug, exposing the rear side with all the components easily accessible for installation and service.

Perfect for Board Rooms

Imagine how effective the present solution is for a board room or conference room where the company leases the space and cannot deface the walls to run wires or pepper the wall with holes. In addition to solving the acoustical nightmare found in most board/conference rooms, the wall panels may incorporate lighting and/or branding graphics on the face, as well and wireless microphones, speakers and Bluetooth audio distribution electronics and necessary wiring, on the rear side of the panel grid system.

The present kit contains all the parts to outfit the long (side) wall and a pair of panels to mount on the front wall, one for each side of a large flat panel TV or projection screen. These panels may incorporate speakers with wireless connection to the main side panel, providing high quality audio for the multimedia system as well as wireless microphones and other electronics to support video conferencing.

Wellness Rooms

There is a growing interest in wellness rooms for both homes and business where people can go to de-compress or otherwise recharge their spiritual batteries. Such rooms may have wall panels on three sides and even the ceiling panels for the ultimate acoustical control. The system's unique fabric covering system supports any type of thin flexible materials including perforated vinyl which can be used in lieu of the fabric on some or all panels, creating a nearly seamless projection wall that, along with overhead projectors and a distributed surround sound audio system integrated behind the panels, transforms the room into another time or place. The quiet, hushed nature of such a small room with imagery and sounds to sooth and relax the occupants, is something the present design can more easily and effectively provide more than any other solution on the market today.

The present modular wall overlay systems provide for easy assembly and installation and also can be customized in many different ways including but not limited to the dimensions of the frame, the texture and decorative features displayed on the cover, accessories that can be added to the system, etc.

In one aspect, a modular wall overlay system for installation on a support surface includes an outer frame having a pair of opposing ends and a pair of opposing sides and a customizable inner frame that is coupled to the outer frame. The inner frame includes a plurality of transverse supports that extend between the opposing sides and a plurality of longitudinal supports that extend between the opposing ends. The longitudinal supports and the transverse supports lie in a common plane defined within the outer frame. The system further includes a cover that is securely retained on the outer frame.

In one embodiment, each longitudinal support is formed of a pair of end rails and one or more intermediate rails with a plurality of inner brackets attached to the pair of end rails and the one or more intermediate rails. Each bracket has a first face to which one end rail and one intermediate rail is attached in spaced relationship with one respective transverse support extending across the first face between the one end rail and the one intermediate rail. The system further can include a first printed circuit board that is disposed along a second face of the bracket and a light fixture that includes a base that is disposed over the first face of the bracket and a cover that is detachably coupled to the base. The first printed circuit board and the light fixture are electrically connected through overlapping openings formed in the bracket and the base of the light fixture.

BRIEF DESCRIPTION OF THE DRAWING FIGURES

FIG. 3A is a front elevation view of a wall overlay frame assembly according to one embodiment (standard panel design);

FIG. 3B is a front elevation view of a wall overlay frame assembly according to another embodiment (lighting wall panel design);

FIG. 3C is a cross-sectional view of a frame element of the wall panel frame assembly;

FIG. 4 is an elevation view of the standard wall overlay frame assembly;

FIG. 5 is a perspective view of a corner of the wall overlay frame assembly;

FIG. 6 is a rear perspective view of a corner bracket;

FIG. 7 is a front perspective view of the corner bracket;

FIG. 8 is an exploded perspective view of the corner bracket assembly in combination with the wall overlay frame assembly;

FIG. 9 is a schematic showing the inward positioning of the feet of the corner brackets;

FIG. 10 is an end elevation view of a T-section frame that is part of the wall overlay frame assembly;

FIG. 11 is a perspective view of the T-section frame;

FIG. 12 is a perspective view of one exemplary mounting system for mounting one end of the wall overlay frame assembly;

FIG. 13 is an end elevation view of the mounting system and wall overlay frame assembly;

FIG. 15 is a perspective view of one corner showing a corner bracket and one corner of the wall overlay frame assembly;

FIG. 16 is a front elevation view of one corner of the wall overlay frame assembly showing a corner insert;

FIG. 17 is a front elevation view of the corner insert;

FIG. 18 is a side elevation view of the corner insert;

FIG. 19 is a front elevation view of the wall overlay frame assembly with a cover retention system;

FIG. 20 is a bottom and side perspective view of the wall panel frame assembly with the cover retention system;

FIG. 22 is a partial perspective view of the rear of the wall overlay frame assembly;

FIG. 23 is a cross-sectional view of a pulley block;

FIG. 25 is a front elevation view of the safety bracket and wall mount;

FIG. 26 is a rear perspective view of the safety bracket;

FIG. 31 is a front elevation view of the first rail bracket;

FIG. 32 is a side elevation view of the first rail bracket;

FIG. 33 is a rear elevation view of the first rail bracket;

FIG. 39 is a front elevation view of the lighting wall overlay frame assembly;

FIG. 40 is a front perspective view of the lighting wall overlay frame assembly;

FIG. 41 is an exploded perspective view of one exemplary lighting device;

FIG. 42 is a top plan view thereof;

FIG. 43 is a perspective view thereof;

FIG. 44 is a perspective view of a magnet coupler for use in the lighting device;

FIG. 47 is a perspective view of the lighting device with cover;

FIG. 48 is an exploded view of the lighting device with cover;

FIG. 49 is a perspective view of a corner bracket according to another embodiment; and FIG. 50 is a rear elevation view thereof.

DETAILED DESCRIPTION OF CERTAIN EMBODIMENTS

FIGS. 1-48 illustrate various modular wall overlay (panel) systems 100, 500 that are configured for detachable coupling to a support surface, such as a wall or ceiling found in a home theater space or any type of room for that matter. As discussed herein, the modular wall overlay system 100, 500 not only can provide a pleasing aesthetic appearance in the home theater space and can be used to conceal AV devices, such as wall mounted speakers, but it is also configured to provide functional features, such as an optional lighting system, etc.

Figure 1:
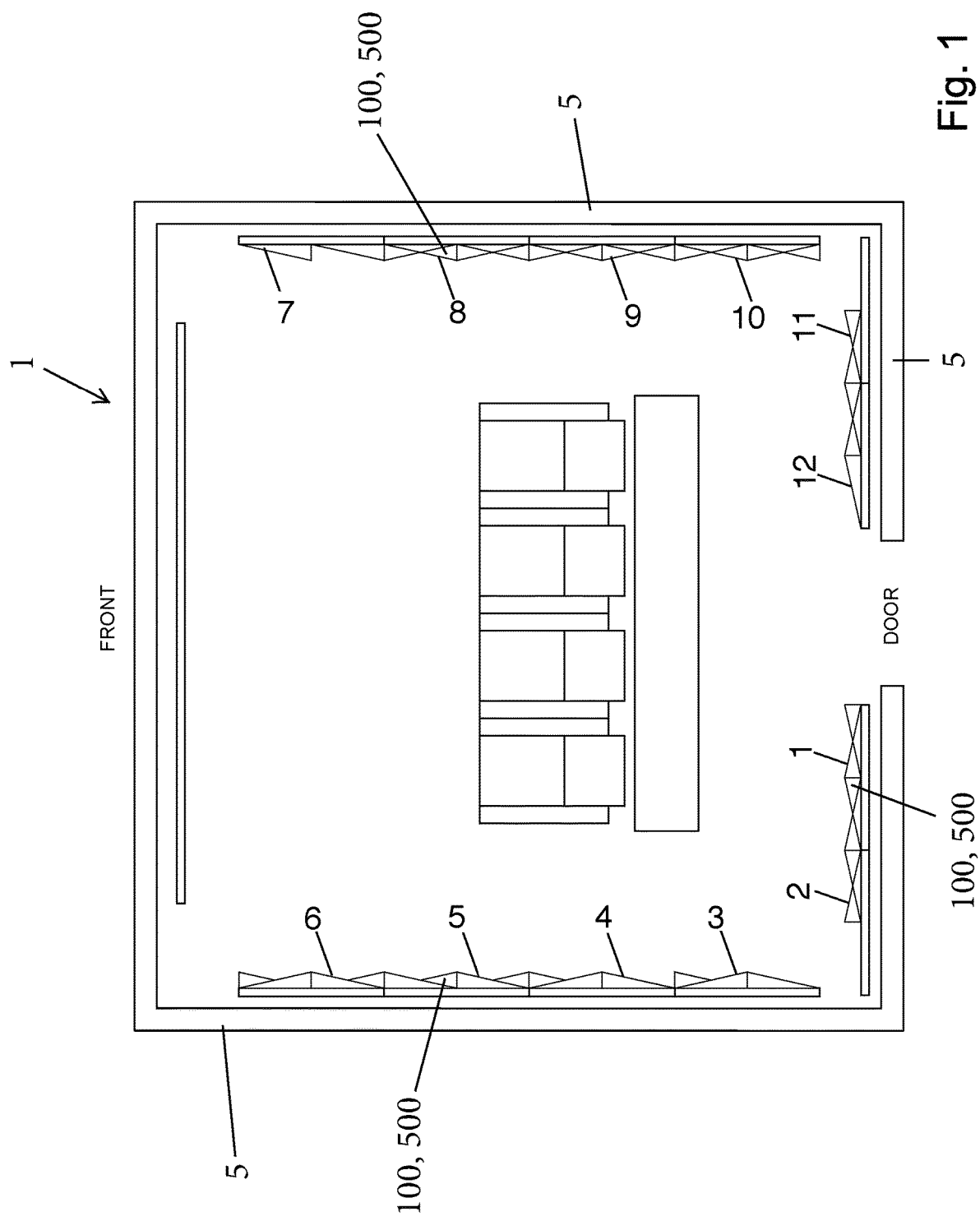
FIG. 1 is a top plan view of a room in which one or more modular wall overlay systems are installed.

FIG. 1 shows a room 1, such as a home theater, that has a number of walls 5 and seating 7. On one or more of the walls 5, there are one or more of the modular wall overlay systems 100, 500.

Standard Wall Overlay Construction (System 100)

Figure 2:
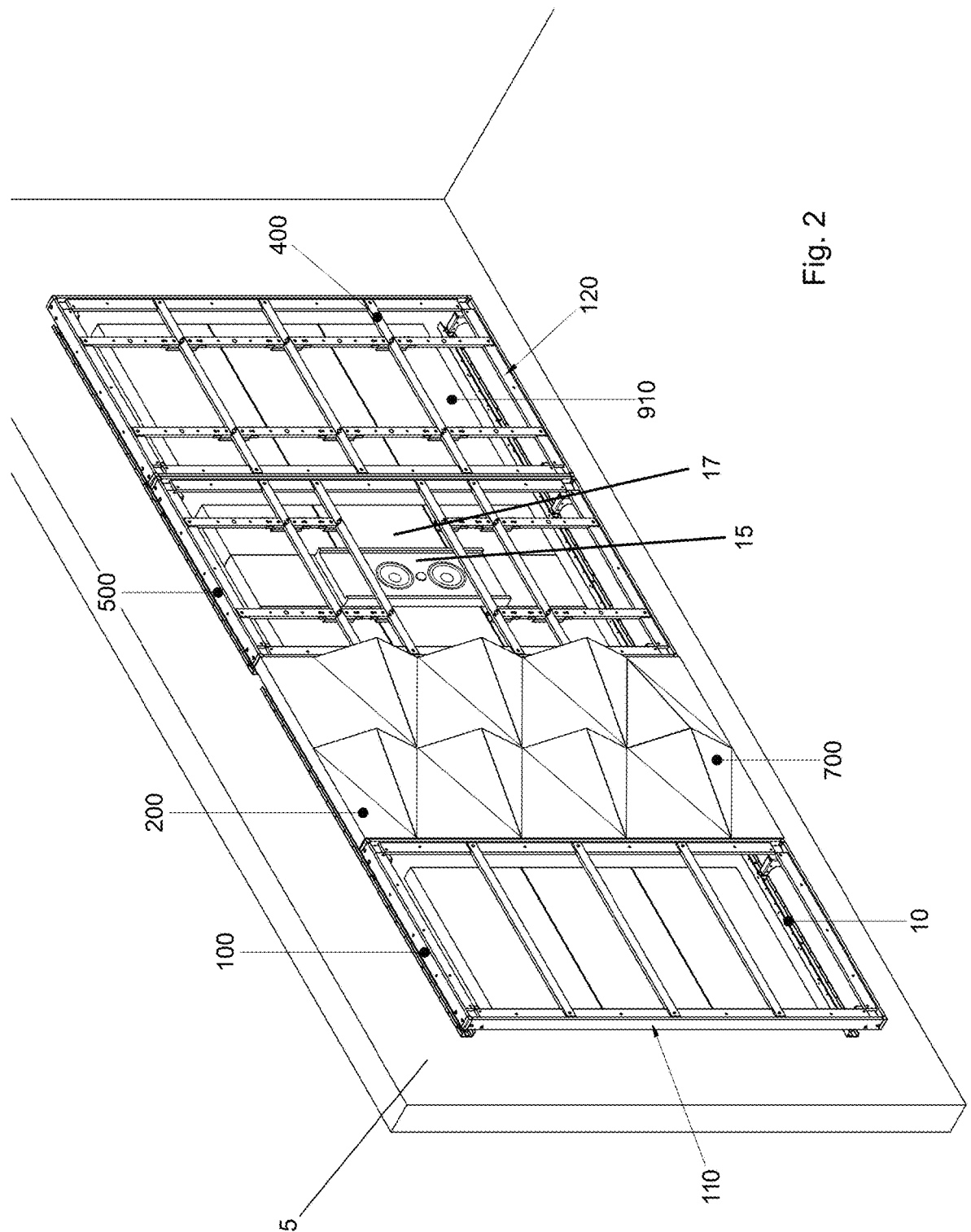
FIG. 2 is a front perspective view of a wall overlay system according to one embodiment.

The modular wall overlay system 100 in its basic form comprises a shell (outer frame assembly) 110, a cover 200, and a tensioning mechanism 300 for tensioning the cover 200 onto the shell 110 so as to produce a taut cover wrapped overlay (panel) assembly that can be mounted to the support surface. It will be readily appreciated that the shape and dimensions of the modular wall overlay system 100 are customizable and are selected to fit the intended application and intended installation location. FIGS. 1 and 2 show the modular wall overlay system 100 installed on the wall 5. In FIG. 2, the modular wall overlay system 100 is mounted to the wall so as to cover and conceal a speaker 15. The panels 17 shown in FIG. 2 that surround the speaker 15 are acoustic treatments, such as raw fiberglass panels. These acoustic treatments 17 are placed on the walls around the speakers, to absorb, diffuse and reflect sound, depending on their location. The position, type and number of panels 17 can be determined by an acoustical engineering company for the various size and shape range of rooms. These acoustical panels 17 and the on-wall loudspeakers 15 are all hidden by the modular wall overlay system 100 and covered by the cover 200 which can be an acoustically transparent fabric. As discussed below, acoustic treatment panels are also shown at 910.

It will also be appreciated that, as discussed herein, the wall covering (panel) systems described herein have much wider applicability than just home theater spaces and can be used in any number of different room settings, such as a corporate board room, home media room, listening room, a wellness room, etc. Broadly speaking, the wall overlay system 100 can be used to conceal any article that is mounted to a wall, such as wiring, a speaker, electronics, etc., and/or can be used to conceal an unsightly condition, such as a hole in a wall or other damaged or marred surface.

The outer shell 110 includes a number of frame parts that are assembled together to form the shell 110. As mentioned above, the dimensions and shape of the modular wall overlay system 100 are highly customizable. For example, the modular wall overlay system 100 can have a rectangular shape, square shape, parallelogram shape, trapezoidal shape, and a triangular shape just to name a few exemplary shapes. The shell 110 includes a plurality of elongated beams (frame sections, including frame sides and frame top & bottom) 120. The relative lengths of the beams 120 will vary depending upon the size and shape of the shell 110. For example, in the event that the shell 110 has a square shape, the lengths of the beams 120 will be the same, while in the event that, as illustrated, the shell 110 has a rectangular shape, there will be a first set of beams (side beams) 120 having first lengths and a second set of beams (end beams) 120 having second lengths greater than the first lengths. The first set of beams 120 would define the top & bottom of the rectangle, while the second set of beam members 120 would define the sides of the rectangle.

Each beam member 120 is formed of several parts including an outer frame 122 and a spline 124 as shown in FIG. 3C. The outer frame 122 has an inner surface and an opposing outer surface. Along the inner surface a slot or the like is formed and receives the spline 124 so as to form a T-shaped beam 120 as shown in FIGS. 10 and 11. The spline 124 can be secured within the slot (of the outer frame 122) by an adhesive (glue) or other techniques, such as use of a fastener, etc.

The spline 124 is located between the first edge and the opposing second edge of the outer frame 122 and is formed at a right angle relative to the inner surface of the outer frame wall 122 such that it extends inwardly from the inner surface toward an interior of the shell 110. In the illustrated embodiment, the spline 124 is not centrally located but is skewed towards one of the edges of the outer frame 122 and is thus off-centered along the outer frame 122 (FIGS. 3C and 10).

As shown in FIG. 8, each beam 120 has a plurality of openings (through holes) 121 formed therethrough. These openings 121 can be of different sizes and, as described herein, are intended to receive elements, such as fasteners, wiring, etc. to allow attachment of one or more objects to the beam.

The beams 120 are not directly attached to one another as shown in FIGS. 8 and 9; however, instead, the shell 110 includes corner brackets 130 that are configured to attach one end of one beam 120 to another end of another adjacent beam 120. The corner bracket 130 can take any number of different shapes and sizes that are complementary to the beams 120 to which the corner bracket 130 attaches. When the shell 110 has a rectangular shape, as illustrated, the corner bracket 130 can have a square shape. The corner bracket 130 has a back (rear) wall 132 for attachment to the spline 124 of the two adjacent beams 120 (i.e., the plane of the rear wall 132 coincides with one mounting surface of spline 124 of one beam 120, while another portion of the rear wall 132 coincides with the mounting surface of the other spline 124 of the adjacent beam 120). The corner bracket 130 also has a first side panel 134 for placement against the inner surface of the outer frame 122 of the one outer beam 120 and a second side panel 135 for placement against the inner surface of the outer frame 122 of the other beam 120 (the two beams 120 are formed perpendicular). Opposite the second side panel 135 is a third side panel 131 that faces the inside of the panel frame assembly 110.

Along an inner corner of the corner bracket 130 there is an upstanding support (post or foot) 133 that extends outwardly from both the rear panel 132 and the second side panel 135 (and is oriented perpendicular to the rear panel 132 and the second side panel 135). At the distal end 137 of the support 133 there is a first coupling member 139 that is configured to detachably connect the wall panel 100 to the support surface, such as wall 5. The support 133 thus extends rearwardly away from the frame assembly and extends rearwardly beyond the walls 131, 135, 134.

The corner bracket 130 of FIGS. 6 and 7 can be thought of as being a right angle corner bracket in the walls 131, 134, and 135 are disposed at 90 degree angles relative to one another resulting in the opposing walls 131, 135 being parallel and the corner bracket 130 having a square shape.

As shown in FIG. 9, the upstanding support 133 is purposely offset from the beams in that the upstanding support 133 is spaced inside of the corner, away from the members that define the frame. In this way, the upstanding support 133 can be hidden from view when the system 100 is viewed from the front and side.

In one implementation, the first coupling member 139 is comprised of a magnet, such as a round permanent magnet (however, it can have any shape). In addition, the overlay system 100 is configured with sound dampening in mind in that any interfaces that may promote a rattle sound, such as a metal to metal interface, are addressed by placing a dampening material in these interfaces. For example, a piece of sound dampening material, e.g., a piece of fabric, such as felt, can be placed on the exposed face of the first coupling member 139. This material does not interfere with the detachable coupling of the modular wall overlay system 100 to the support surface since, as described herein, the support surface has a metal substrate to which the first coupling member 139 attaches. For example, each corner of the shell 110 includes a magnet 139 for detachably coupling the modular wall overlay system 100 to the support surface, such as the wall 5.

Figure 14:
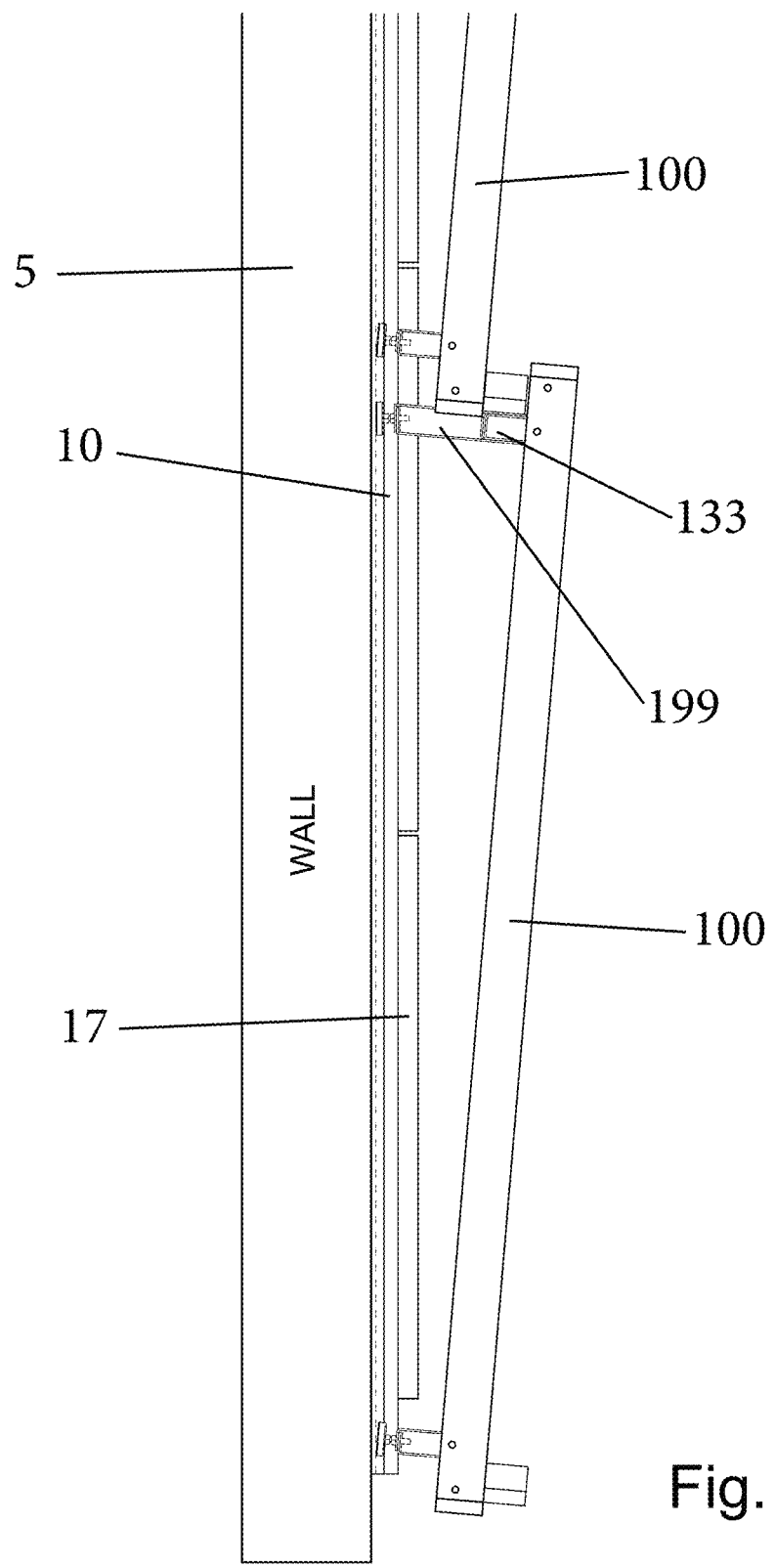
FIG. 14 shows the offsetting of the wall overlay system from the wall.

As described herein, the magnet 139 can have a threaded stem 138 to allow the distance from the magnet 139 to the shell/covering to be varied as by screwing the magnet 139 toward or away from the frame (and the rear wall 132). This allows customization of the distance between the panel and the wall 5. For example, as shown in FIG. 14, one end of the system 100, such as the top end, can be further offset from the other end (bottom end) to produce an angled wall overlay system. The foot 133 can have an extension piece 199 that further extends the foot length causing the top end to be spaced further from the wall. The magnet 139 and threaded stem 138 are then used with the foot extension. As shown in FIG. 14, one end of one system 100 overlaps one end of another system 100. The space between the overlapped portions can accommodate accessories, such as providing a lighting channel. FIG. 14 also shows acoustic treatment 17 behind one overlay system 100.

One exemplary arrangement, shown in FIGS. 12 and 13, for detachably coupling the overlay system 100 to the support surface (e.g., wall 5 of FIG. 2) involves using mounting hardware that is attached to the support surface and more particularly, one or more mounting channels (mounts) 10 can be used. Each mounting channel 10 can be in the form of an elongated structure that has a length that is long enough to allow the magnets 139 in two opposing corners at the same end of the panel to be received within the channel 10. The channel 10 can have a C or U shape or it can be flat with limited or no side walls. The channel 10 has a rear wall 12 (located between any side walls that may be present) that is for placement against and securement to the support surface, such as a wall. Any number of techniques can be used to attach the channel 10 to the support surface, such as using fasteners or the like.

Along the outward facing face of the rear wall 12, there can be a strip of a ferrous material 14 that is magnetically attracted to the magnets 139. Alternatively, there can be spaced pads of ferrous material located on this face. Thus, in one implementation, the rear wall 12 (along with the other walls) can be formed of a non-ferrous material, such as wood or plastic, and the ferrous material 14 can be in the form of an inlaid strip or the like. To attach a rectangular shaped modular wall overlay system 100, two mounting channels 10 can be used and mounted to the support surface. The channels 10 are spaced apart the proper distance so as to receive the magnets 139 in the four corners of the overlay system 100. Thus, one mounting channel 10 is located higher up on the wall (or to the left of the wall) and the other mounting channel 10 is located lower down on the wall (or to the right of the wall).

To attach the modular wall overlay system 100 to the support surface (wall 5), modular wall overlay system 100 is lifted to place the corner magnets 139 into contact with the ferrous material 14 of each channel 10. A dampening material (e.g., felt) is disposed between the magnets 139 and the ferrous material 14 to eliminate any rattling noise or the like (the felt thus serves as an anti-vibration feature). The dampening material can be attached to the magnet 139 using an adhesive (the felt does not adversely impact the magnetic attraction).

As shown in FIGS. 6-8, the rear wall 132, first side wall 134, and second and third side walls 135, 131 include openings (e.g., threaded through holes) 136 that align with openings 121 formed in the outer frame of beam 120. In particular, the openings 136 formed in the rear wall 132 align with openings 121 formed in the spline 124 of the two outer frame members of beam 120 that form the corner in which the corner bracket 130 is installed and fasteners 141 (FIG. 8) pass through the aligned holes 121, 136 and securely attach the corner bracket 130 to the two outer frame members of the beam 120. Similarly, the openings 136 formed in the side wall 135 and the side wall 134 align with openings 121 formed in the outer frame walls 122 of the two outer frame members and fasteners pass therethrough for securing the corner bracket 130 to the outer frame walls 122 of the two outer frame members of the beam 120.

In this way, the corner bracket 130 is attached to the two outer frame members of beam 120; however, since the two outer frame members of the beam 120 in each corner of the frame 110 do not meet in the corners, there is a gap between the two outer frame members or beam 120 as shown in FIG. 5. This gap is filled with a corner insert 140 as described below. It will also be appreciated that the ends of the outer frame members of beam 120 that define the corners can be contoured as opposed to being completely smooth edges and instead can include a notch 145 (FIGS. 5 and 16) or the like. For example, the notch 145 can be formed along the inner surface of the outer frame wall 122 at the end so as to form a stepped shaped end.

As mentioned, the gaps defined between the ends of the outer frame members or beam 120 in each corner is filled with one corner insert 140 (See, FIGS. 5 and 15-18). The corner insert 140 has a complementary shape to the gap in the corner between the two frame ends. The corner insert 140 is preferably formed of an elastic material and can be formed of rubber or a polymeric material. The corner insert 140 has a block form (e.g., block shaped square) with the two inner walls of the block have inwardly extending projections (rails) 142. These projections 142 are thus linear structures that index into the notches 145 formed at the ends of the two frames members of beam 120 to lock the corner insert 140 in place between the two outer frame members or beam 120. The corner insert 140 is a completing element since it fills in the gap between the ends of the two outer frame members 120 when the outer frame 10 is assembled. The corner insert 140 is slid into this gap between these two frame ends to complete the corners of the frame (shell) 110.

An inner surface of the corner insert 140 that is opposite the outer curved surface is configured for contacting and being placed in an abutting relationship to one corner of the corner bracket 130. More particularly, the corner bracket 130 can make contact with inner surfaces of the projections 142 of the corner insert 140. The portion of the inner surface of the corner insert 140 between the projections 142 can be curved; however, the corner bracket 130 can be constructed such that it only contacts the inner faces of the projections 142 and not this curved surface of the insert that is between the two projections 142.

It will be appreciated that in an alternative embodiment, the notches (female coupling elements) can be formed in the corner insert 140 and the complementary projections (male coupling elements) can be part of the ends of the frame 110.

As discussed herein, the corner inserts 140 can be and preferably are installed at a later point in the overall assembly process such as after installation of the cover 200 but before final tensioning of the cover 200 with the tensioning mechanism 300 (FIG. 20). The elastic nature of the corner insert 140 allows for the fabric cover 200 to be stretched over the insert 140, creating a radiused corner. In other words, as opposed to a sharp frame corner, the corner insert 140 has a rounded outer edge (FIG. 19) and also is formed of an elastic material (e.g., rubber) and therefore, when the fabric cover 200 is tensioned, the corner insert 140 has some elasticity (and give) to prevent tearing of the fabric cover 200 in its corner section. However, in one preferred implementation, the cover 200 is formed of an anti-stretch fabric and thus, the tensioning mechanism 300 is not used to stretch the fabric cover 200 but instead is used to retain the fabric cover 200 on the frame 110 by simply placing the fabric cover 200 under tension as opposed to elastically stretching the fabric under an applied force.

It will be appreciated that the shape of the corner bracket 130 depends on the intended shape of the outer beam members 120. For example, if the outer beams 120 are oriented in a parallelogram arrangement, then the corner bracket 130 will not have a square shape as in the case of a square or rectangular shaped shell 110. Moreover, the shape and size of the corner insert 140 will also depend on the shape of the corner bracket 130 and the orientation of the frame ends.

More specifically, the corner bracket 130 can be constructed to have a different shape to complete different shaped corners of a frame that does not have a right-angle corner. In other words, it will be appreciated that the system 100 allows for a wide degree of customization including customization of the corner brackets 130. For example, FIGS. 49 and 50 illustrate an alternative shape corner bracket 190 that unlike the corner bracket 130 does not have a square shape. The corner bracket 190 includes walls 131, 134, and 135; however, the angle between wall 134 and wall 135 is not 90 degrees and thus, this portion of the corner bracket 190 is not formed at a right angle. The angle between walls 131, 134 is a 90-degree angle. The corner bracket 190 thus allows for the frame pieces 120 to be attached at angles other than 90 degrees and thus, allows the formation of an overlay system that likewise does not have a right angle in at least one corner. It will be appreciated that FIGS. 49 and 50 only shows one alternative and many other alternative constructions are possible for the corner bracket depending upon the shape of the overlay system itself.

Similarly, the corner insert 140 (and corner bracket 130) can be formed in any number of different shapes to allow for the use of a standard set of beams to form different shaped main frames, thereby offering an attractive modular design that allows creation of many different frame shapes and sizes. As discussed herein, the corner insert 140 facilitates in the positioning and tensioning of the outer overlay cover over the frame.

The shell (frame) 110 can be formed of any number of different rigid materials including but not limited to wood, plastic, metal, etc. The corner bracket 130 can be formed of suitable materials, such as a metal or plastic.

The cover 200 (FIGS. 2 and 5) is designed to be securely fitted over the shell 110 in a manner in which the cover 200 can be easily removed from the shell 110 as in the case of cleaning or replacement. As will be appreciated from the discussion herein, the cover 200 is not permanently attached to the shell 110 as by use of an adhesive or the like and instead is held in place by the design of the shell 110 and by use of the tensioning mechanism 300 (best shown in FIGS. 19-23). The cover 200 can provide an aesthetic look to the home theater space in that the cover 200 can have any number of different colors, prints, textures, etc. The cover 200 can have printed matter formed thereon, such as printed image of a scene or person. Any number of different themes can be displayed and conveyed by the cover 200 and the ability to customize the covers 200 allows the entire home theater space to be designed with a theme in mind. For example, if the end user is a lover of basketball, the cover 200 can include an image of a basketball player, such as a player drippling a basketball. A team logo can also be placed on the cover 200. Any number of other graphic details and even text can be placed on the covers 200. The cover 200 can thus be formed primarily of a single color or can be formed of multiple colors.

The cover 200 can be formed of any number of materials and can be in the form of a fabric material, such as polyester based canvas. When the overlay system is intended for use with a speaker, the cover 200 is formed of an acoustically transparent fabric (FIGS. 19-23). The cover 200 has a main portion 210 and edging 220 that extends around the rear side of the periphery of the main portion 210 but is not continuous. In other words, the edging 220 can be in the form of discrete edging sections 222 that are located along the rear sides of the main portion 210. Each edging section 222 can be in the form of a pocket and in particular, can be in the form of a looped or folded piece of material that is secured to the rear edge of the main portion 210 as by stitching or other techniques. The edging section 222 can be formed of the same material as the main portion 210 or can be a different material and can have a different color than the main portion 210. As also mentioned herein, in other applications, the cover 200 can be in the form of a canvas (e.g., an artist's canvas) or other substrate material that can be held onto the frame 110 under tension.

Figures 21A, 21B:
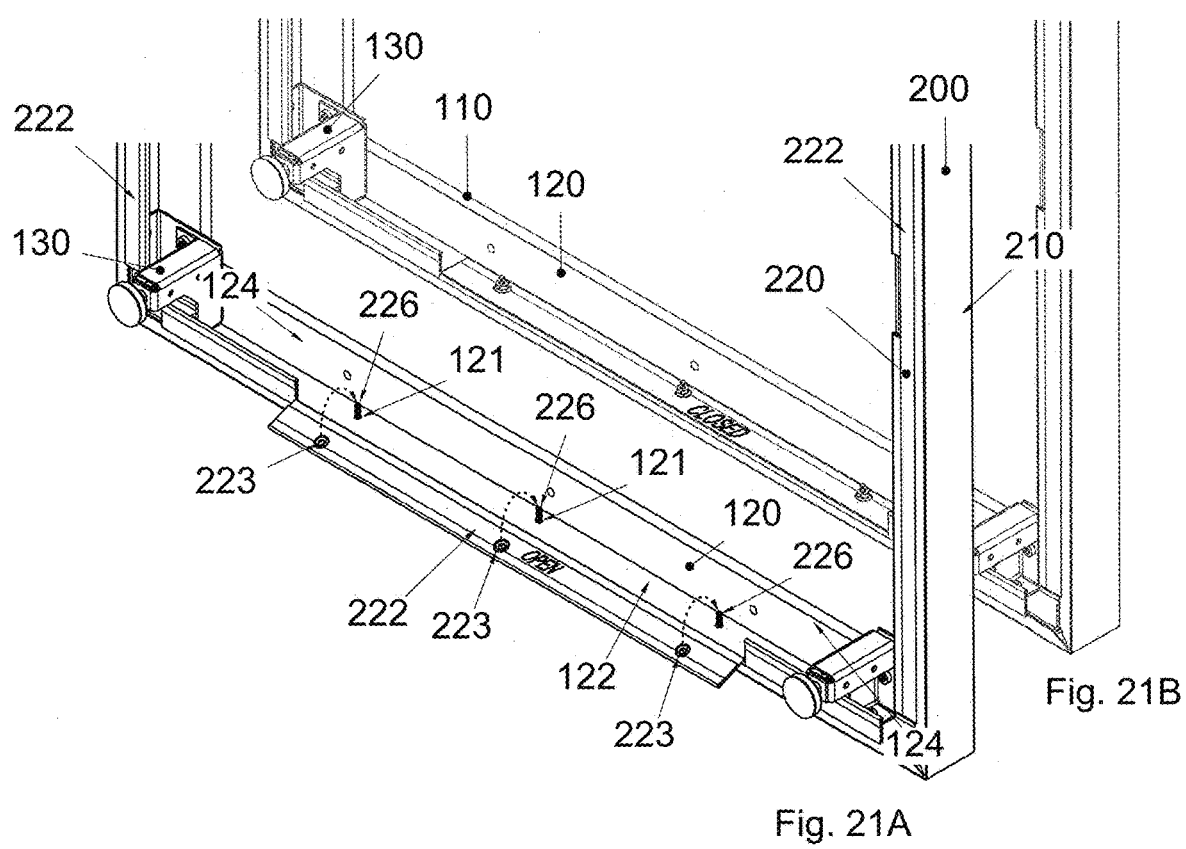
FIG. 21A is a bottom perspective view of the wall overlay frame assembly with the cover retention system in an open position.
FIG. 21B is a bottom perspective view of the wall overlay frame assembly with the cover retention system in a closed position.

Along one edging section 222, there are openings (eyelets) 223 formed therein (FIG. 21A). More particularly, as shown in FIG. 21A, one edging section 222 can be in form of a cut flap of fabric material that is foldable between an open position (FIG. 21A) and a closed position (FIG. 21B). This one edging section 222 with the eyelets 223 is intended for positioning along one outer beam 120 that has through holes 121 formed in the outer frame wall 122. The eyelets 223 are inserted over fasteners (locating posts) 226, such threaded studs, disposed along the inner surface of the outer frame wall 122 of one outer frame member of beam 120 (e.g., one end frame member or beam 120) and nuts are used to retain the cover 200 to the inside of this one outer frame member of beam 120. As shown in the figures, the tensioning mechanism 300 is positioned over this one edging section 222 that is foldable.

The cover 200 is thus meant to be disposed, in a taut state, along a front face of the frame 110 as well as along the sides of the frame 110 such that when the panel 100 is mounted to the support surface, the cover 200 completely covers the areas of the panel 100 that are visible.

The cover 200 is thus sized so that it can be completely folded over the outer frame walls 122 of the beam 120 and then folded inward along the exposed rear face of the shell 110. As illustrated, in the assembled state, the edging sections 222 are disposed along the rear face of the shell 110 so as to not be visible in the end use (when the system 100 is mounted to the support surface).

To assemble the overlay system 100, the cover 200 is placed face down and the assembled shell 110 is placed along the backside of the main portion 210 of the cover 200 with the front face of the shell 110 in contact with the main portion 210 of the cover 200.

Tension Mechanism

As shown in FIGS. 19-23, the tensioning mechanism 300 is intended to tension the cover 200 over the shell 110 to ensure that the cover 200 remains securely in place during use and remains in a taut state. The tensioning mechanism 300 is configured to be adjustable by the user in that the user can manipulate the tensioning mechanism 300 to apply greater or less tension to the cover 200. In one implementation, the tensioning mechanism 300 comprises a cable 310 that has a first end 312 and an opposing second end 314. Any number of suitable cables 310 can be used and in one implementation, the cable 310 is in the form of a braided metal cable. The cable 310 is routed through the pocket (inner opening) of the edging sections 222 with crimped loops on each of the ends 312, 314 of the cable 310 being exposed along the one edging section 222 that contains the eyelets 223.

In addition to the cable 310, the tensioning mechanism 300 includes a turnbuckle 320. As is known, a turnbuckle is a device for adjusting the tension or length of ropes, cables, tie rods, and in the modular wall overlay system 100 is used to adjust the tension in the cable 310. As shown in FIG. 20, the turnbuckle 320 consists of first and second threaded hooks 322, 324, one screwed into each end of a frame 326 (e.g., a small metal frame), one with a left-hand thread and the other with a right-hand thread. Rotation (turning) of the turnbuckle 320 brings the ends closer together, thereby tightening the cable 310. The cable end 312 loop is attached to one hook 322, while the other cable end 314 is attached to the other hook 324. Since the edging sections 222 do not meet in the corners, the cable 310 is exposed in each of the corners of the shell 110.

The tensioning mechanism 300 is configured such that the turning of the turnbuckle 320 draws the two looped ends 312, 314 of the cable 310 toward one another placing the cable 310 under more tensioning due the tightening of the cable 310. As mentioned earlier, the corner inserts 140 can be installed after the cover 200 is wrapped around the frame 110 but before the turnbuckle 320 is turned for tensioning of the cable 310. For example, the corner inserts 140 can be slid into the gaps. After installation of the corner inserts 140 and before the tensioning of the cable 310, the corners of the cover 200 can be pulled up and over the splines 120 with the edging sections 222 being positioned above the rear face of the shell 110.

Cross Supports

Figure 28:
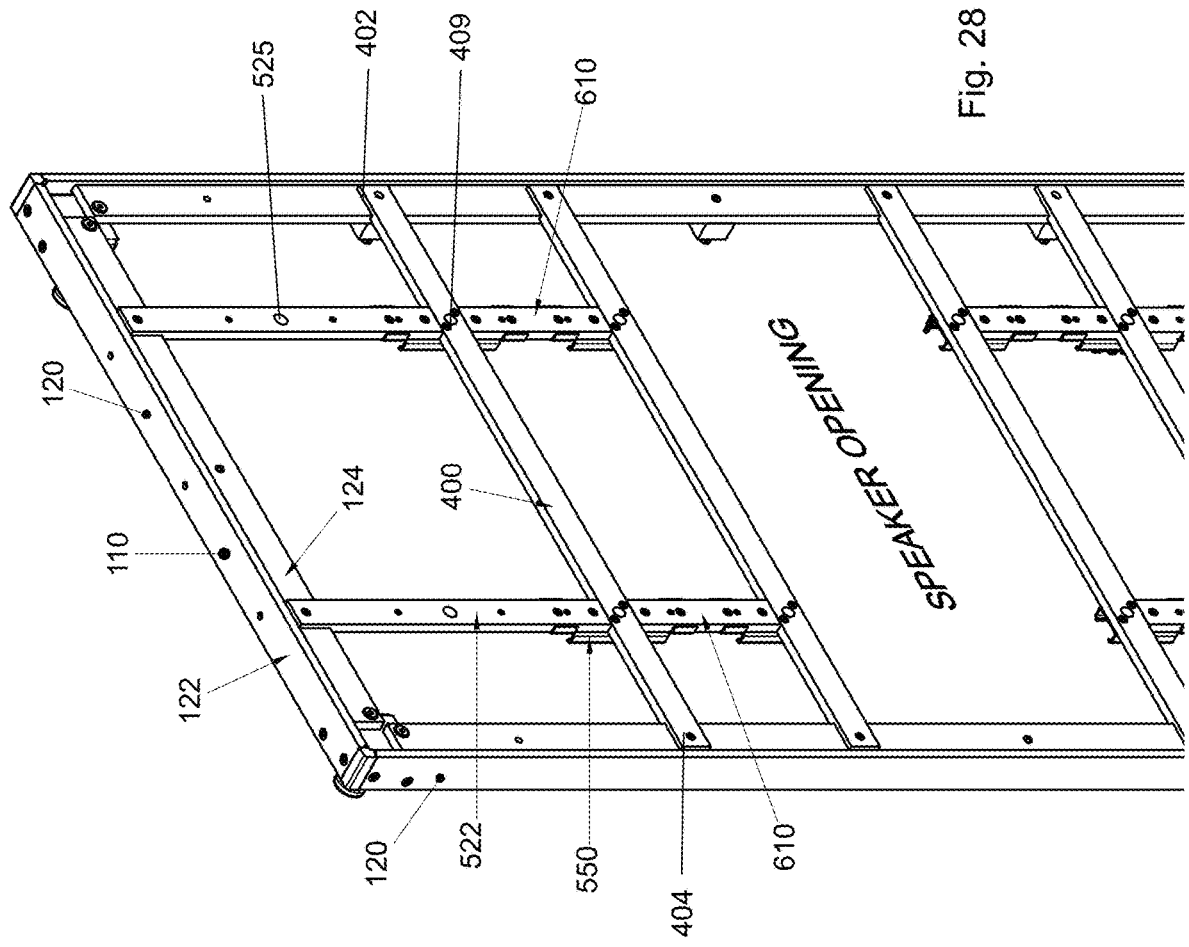
FIG. 28 is a front perspective view of the alternative, customizable wall overlay frame assembly.
Figure 27:
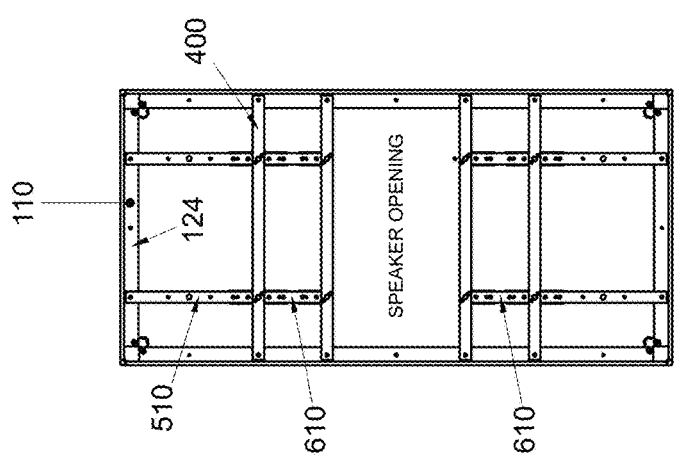
FIG. 27 is a front elevation view of an alternative, customizable wall overlay frame assembly.

For larger sized modular wall overlay systems 100, such as those taller than 48 inches, the frame (shell) 110 may need additional support in the form of one or more cross support (rib) 400 that extend between two opposing vertical splines 120. As shown in the figures, each cross support 400 is in the form of elongated support (e.g., a horizontal rib that extends between two side outer frame members 120 of the shell 110) with a stepped construction at a first end 402 and an opposing second end 404 (FIGS. 22 and 28). In particular, the cross support 400 has a non-uniform thickness in that each of the two ends 402, 404 has a reduced thickness and a right-angle shoulder is formed. The steps (shoulders) at each end 402, 404 are constructed in view of the splines 124 of the outer frame member 120 since the reduced thickness end 402, 404 of the cross support 400 seats against the spline 124 and the right angle shoulder seats against the inner edge of the spline 124. The reduced thickness sections at ends 402, 404 have an opening (through hole) 405 formed therein. The reduced thickness end sections of the cross support 400 thus seats above the inner wall 124 below the front edge of the outer frame wall 122 and thus is set back from the front face of the shell 110. The ends 402, 404 of the cross support 400 are attached to the inner walls 402, 404 using fasteners or the like that pass through aligned openings 405, 121. In addition, the cross support 400 can have a larger sized opening 409 (FIG. 28).

In addition, the ends 402, 404 of the cross support 400 are offset (setback) a prescribed distance from the inner surface of the outer frame wall 122 of the outer frame member of beam 120 to ensure that the cross supports 400 do not contact the cover 200 and produce a line across the front of the cover 200. For example, the ends can be set back from the outer frame wall 122 about $40/1000$ of an inch in one implementation of the present disclosure.

Tensioning Blocks

It will be appreciated that when more than one cross support 400 is used, the cross supports 400 can be evenly spaced apart or they can be spaced apart different distances.

As shown in FIGS. 22 and 23, in addition to the cross supports 400, there can be tensioning (pulley) blocks 450 that each has an opening along an inner face that receives the fasteners 459 that passes through openings 405, 121 and a pulley member or post 452 disposed along the outer face of the block 450. The pully blocks 450 provide inward pull to the cable 310 for tensioning thereof along various sections of the frame (shell) 110.

The block 450 is constructed to seat on the spline 124 along the outer face thereof that is opposite the inner face on which the end of the cross support 400 seats. The blocks 450 thus face and protrude rearward toward the support surface (wall 5) when the overlay system 100 is mounted to the support surface (however, the blocks 450 do not contact the support surface). The block 450 is preferably a threaded block in that it has inner threads formed therein to allow a fastener to attach thereto. The height of the block 450 is selected such that it does not protrude above the edge adjacent outer frame wall 122 of the outer frame member 120 (i.e., the rear face of the frame 110). A single fastener is thus used to attach one end (the reduced thickness end section) of the cross support 400 and the block 450 to the spline 124 of one outer frame member 120. The pulley member 452 is preferably located inward relative to this single fastener toward the center opening of the frame 110 (i.e., it is off-center) and in particular, the pulley member 452 can be located near the inner edge of the block 450 as shown in FIG. 22.

The pulley member 452 has a round head and can have a groove for receiving the cable or else the cable can be positioned against the round stem (post) of the pulley member 452. The pulley member 452 are thus provided along the sides of the frame 110 at the select locations of the cross supports 400. Alternatively, it can be placed at other locations.

As shown, one or more pulley members 452 can be installed along the frame 110 without using a corresponding cross support 400. For example, in the illustrated rectangular shaped overlay system 100 (FIG. 19), there is a pulley member 452 located along one end frame member 120 (i.e., the end frame member 120 that is opposite the end frame member 120 along which the turnbuckle 320 is located. When no corresponding cross support 300 is present, the pulley member 452 is merely disposed along the rear surface of the spline 124 and is attached thereto using a fastener. As mentioned, the pulley member 452 is sized to seat within the shell 110 in that it does not protrude rearwardly beyond the rear face of the frame 110.

The pulley member 452 is used to apply tension to the cable 310 along the sides of the frame 110 and is used as part of the cable installation process. At each location along each edging section 222 that there is a corresponding pulley member 452, the edging section 222 has an opening, such as a slit or cut, that allows access to the cable 310 within the pocket of the edging section 222 for allowing the cable 310 to be pulled inward toward the center opening of the shell 110 and more particularly, allow the cable to be pulled inward to allow the cable 310 to be pulled over the pulley member 452 to create tension in the cable 310. As the cable 310 is increasingly tensioned, the pulling of the cable 310 over the last few pulley members 452 may become increasingly more difficult and it may require that the edging section 222 of the cover 220 (along the last outer frame member 120) needs to be pulled over the outer frame wall 122 of the outer frame member of beam 120 (i.e., around shell 110). After this process is completed, the turnbuckle 320 can be tightened to complete the tensioning of the cable 310.

As previously mentioned, the corner inserts 140 can be installed after the cover 200 has been initially fitted around the frame 110 but before the tensioning mechanism 210 is used to tighten the cover 200.

Figure 24:
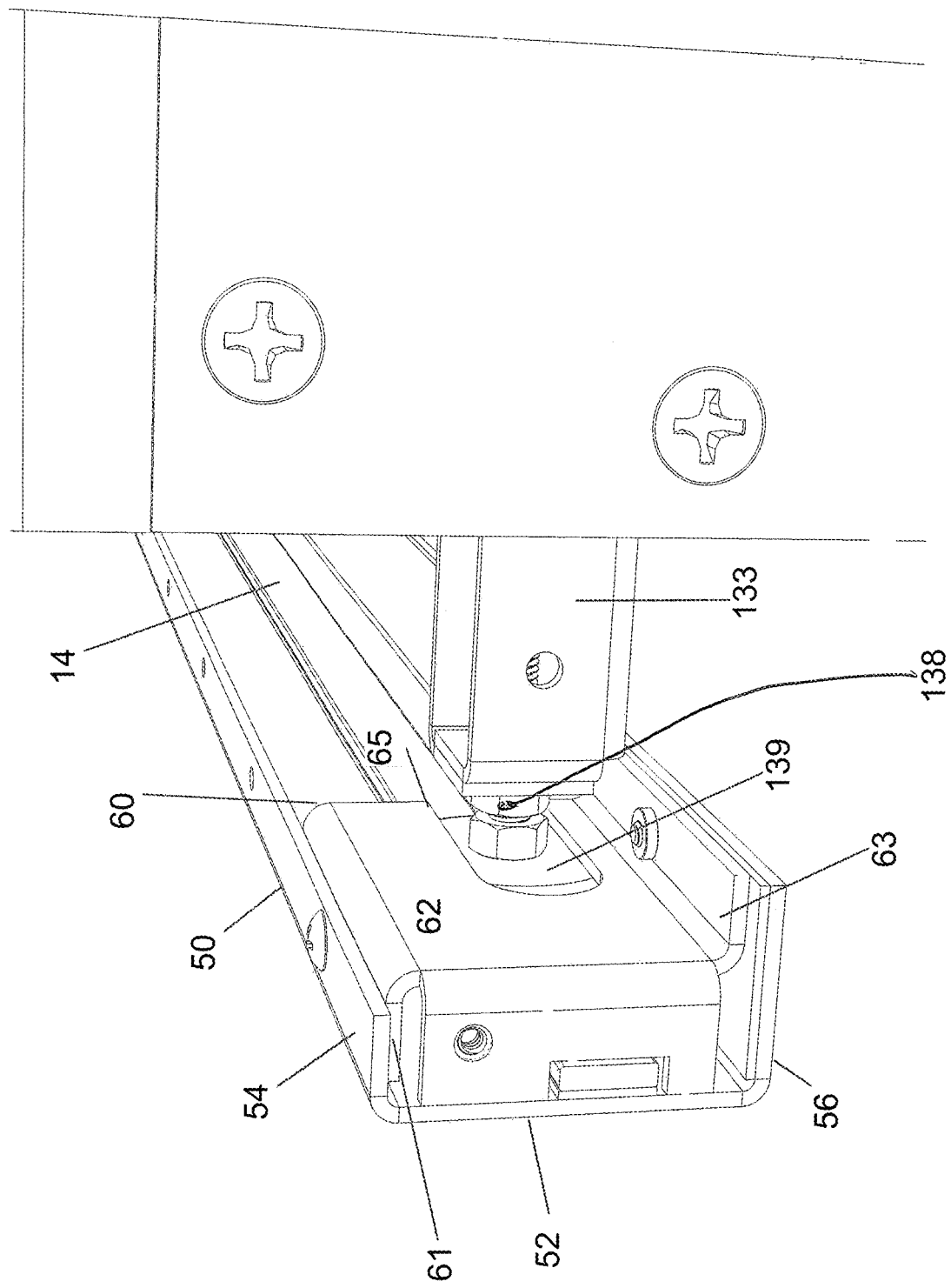
FIG. 24 is an end perspective view of a safety bracket for use with a wall mount.

Alternative Mount (FIGS. 24-26)

In the event that any of the overlay systems described herein, such as modular wall overlay system 100, is to be mounted to a ceiling, an alternative mount or channel 50, which in one implementation can be thought of as being a ceiling mount can be provided and is shown in FIGS. 24-26. The channel 50 is similar to the channel 10 and it can have a C-shape or U-shape defined by a rear surface (wall) 52 and a pair of side surfaces (walls) 54, 56. As shown, the lengths of the side surfaces 54, 56 can be different. Like channel 10, the channel 50 can be in the form of an open-ended elongated structure that has a length that is long enough to allow the magnets 139 in two opposing corners at the same end of the panel to be received within the channel 50. Along the outward facing face of the rear wall 52, there can be a strip of ferrous material 14 that is magnetically attracted to the magnets 139. Thus, in one implementation, the rear wall 12 can be formed of a non-ferrous material, such as wood or plastic or a metal, such as Aluminum, and the ferrous material 14 can be in the form of an inlaid strip or the like that can be attached with an adhesive (e.g., double sided adhesive tape). To attach a rectangular shaped overlay system 100, two brackets 50 can be used and mounted to the support surface. Each channel 50 receives two magnets 139.

Since the channel 50 is intended to be mounted to a ceiling or the like, additional safety features are provided for holding the overlay system 100 in place. More particularly, a safety retainer 60 is part of or coupled to the channel 50 and is positioned along the inner track defined by the channel 50 at a location where the magnets 139 will be placed (i.e., there will be two safety retainers 60 along each channel 50—typically at the ends thereof). The safety retainer 60 can be in the form of an S-shaped structure that has a first flange 61 that seats against the inner surface of the flange 54; an intermediate wall 65 and a second flange 63 that is positioned against the inner surface of the flange 56. The intermediate wall 65 is thus parallel to the rear wall 52 of the channel 50. Within the intermediate wall 65, a slot 66 is formed with the slot being open along a first edge of the intermediate wall 65 and closed at a location spaced from a second edge of the intermediate wall 65. The slot 66 can be U-shaped as shown. The slot 66 is sized so that the support 133 (post) can pass therethrough; however, the magnet 139 cannot since the dimensions (diameter) of the magnet 139 are greater than the dimensions of the slot 66. The magnet 139 seats against the ferrous material 14 (which can be in strip form) and is thus positioned between the intermediate wall 65 and the rear wall 52 and therefore, based on the positioning of the channel 50 along the ceiling, if there was a release of the magnets 139 from the ferrous material 14, the magnets 139 would not pass through the slot 66 but instead would be supported by the safety retainer 60 which is fixedly attached to the channel 50 (i.e., the magnets 139 would fall against the safety retainer 60).

It will be appreciated that the support (foot) 133 can have an adjustable length to adjust the distance from the magnet 139 to the front face of the panel. Alternatively, the stem (e.g., threaded bolt) 138 that protrudes from the distal end of the support 133 and on which the magnet 139 is distally mounted can have an adjustable length so as to allow repositioning of the magnet 139.

The construction and positioning of the safety retainers 60 within the track of the channel 50 is such that the panel can be slid into place and in particular, the supports 133 and magnets 139 can be slid into the slots 66 during installation. Thus, the slots 66 face in the same direction and are thus open in the same direction to accommodate lateral insertion of the panel into the channels 50.

In addition, one or more of the side walls 54, 56 can include a sound dampening material, such as a strip of felt, that lines the inner surface of at least the side wall 56 to prevent any mental on metal contact.

As shown in FIG. 26, the inner surface of the intermediate wall 65 can include a felt material 62 for sound dampening, etc.

By using channels 50, any of the modular wall overlay systems described herein can be mounted to a ceiling or even a slanted wall or the like, whereby the magnetic coupling between the panel and the channels 50 is the primary means for holding the overlay system in place; however, the safety retainers 60 add a secondary means for ensuring the panel remains in place.

Customizable Modular Wall Overlay System (System 500) (FIGS. 27-40)

FIGS. 27-40 illustrate a customizable, modular wall overlay system 500 that is similar to the modular wall overlay system 100 and therefore like elements are numbered alike. For example, the outer frame 110 of both systems 100, 500 can be formed the same way and includes the same parts as shown.

One main difference between the system 500 and the system 100 is that the system 500 has additional structural support (inner grid pattern) within the frame 110 beyond the use of cross supports 400. More particularly, the frame 110 of the system 500 has one or more elongated inner support rails that run longitudinally within the frame 110. More specifically, each inner support rail taken as a totality can run from one end spline 120 to the opposing other end spline 120 or as illustrated herein (e.g., FIG. 39), the inner support rail can extend between (1) one spline 120 and one cross support 400 or (2) the inner support rail can extend between two cross supports 400. It will be appreciated, as discussed herein, that the constructions of the inner support rails can differ depending upon their install location and the lengths will vary also depending upon the dimensions of the overall frame 110 and the grid pattern itself. The inner support rails are laterally spaced apart from one another and also can be separated from one another longitudinally by the cross supports 400. As described herein, each support rail is designed to receive and mate with one or more cross supports 400 so as define a grid-like support structure along the front of the frame 110. As described herein, this grid-like support structure is used for attaching accessories, such as lighting fixtures, to the customizable, modular wall overlay system 500 and also provides means for routing wires and the like, as well as supporting other electric devices, such as communications device that allows communication over a network such as Bluetooth or WIFI, etc., as described herein.

As will be readily understood by a comparison between FIGS. 28 and 39, the hollow interior space within the inner frame 110 can be segmented in many different ways depending upon the specific specifications of the project. For example, the grid pattern in FIG. 28 takes into account the inclusion of a speaker and thus, a speaker opening is created using the inner frame members that define the grid pattern. Alternatively. FIG. 39 shows a more symmetric grid pattern that can accommodate lighting and other equipment, etc. The ability to customize and easily create the desired grid pattern layout is one advantage of the system 500.

In one embodiment, the inner support rails that define the grid pattern are identified at and each pair of the inner support rails is joined together with a rail bracket 550 or other type of bracket that accommodates the cross support 400 as discussed herein. The two or more rail sections can consist of two or more of the same rail sections or can consist of different rail sections. For example, as illustrated in FIG. 39, the inner support rail can be formed of four discrete sections (four inner support rails), namely two end rails 522 and two intermediate rails 530.

Each end rail 522 has an outer (first) end 523 and an opposing inner (second) end 524. The outer end 523 has a stepped construction, while the inner end 524 does not (inner end 524 can be a smooth, flat end). The outer end 523 thus has a reduced thickness and a right-angle shoulder is preferably formed. The step at the outer end 523 is constructed in view of the spline 124 of the outer beam 120 since the reduced thickness outer end 523 of the end rail 522 seats against the spline 124 and the right-angle shoulder seats against the inner edge of the spline 124. The reduced thickness section at the outer end 523 has an opening (through hole) formed therein. The reduced thickness end sections at outer end 523 seats above the spline 124 below the front edge of the outer frame wall 122 and thus is set back from the front face of the frame 110. The right-angle shoulder abuts the inner edge of the spline 124 of the outer beam 120. The outer end 523 is attached to the splines 124 using fasteners or the like that pass through aligned openings.

The end rail 522 include other openings including a larger opening 525 that can be formed centrally therein.

The intermediate rail 530 is similar to the end rail section 522 except it does not include the stepped outer end 523 but rather has two ends 532, 533 that are flat. Larger opening 525 can be formed in the intermediate rail section 530 as well. As described and illustrated herein, the intermediate rail 530 is configured to extend between two cross supports 400.

The rail bracket 550 is thus designed to connect two rails, such as one end rail 522 to one intermediate rail 530 or it can connect two intermediate rails 530. When two end rails 522 are used with one intermediate rail 530, two rail brackets 550 are thus used.

As shown in FIGS. 30-33, the rail bracket 550 has a main center section 560 and a pair of end sections 562. The rail bracket 550 is intended to define a channel or track for receiving the ends of the end rail section 522 and intermediate rail section 530. The main center section 560 has a larger opening 561 that can be formed centrally therein.

Each of the main center section 560 and each end section 562 can have a C-shape or a U-shape; however, the side walls 563 of the main center section 560 face outwardly in a first direction, while side walls 564 of the end section 562 face outwardly in a second direction that is opposite the first direction The first direction is a direction toward the rear face of the frame 110, while the second direction is a direction toward the front face of the frame 110. The side walls 564 are used to cradle the ends of one end rail 522 and one intermediate rail 530 (or ends of two intermediate sections in a very tall modular wall overlay system 500). There are openings formed in both the end sections 562 and the main center section 560 that align with holes formed in the ends of the end rail 522 and intermediate rail 530 for attaching the end rail 522 and the intermediate rail 530 to the rail bracket 550.

As shown, the ends of the end rail 522 and the end of the intermediate rail 530 do not abut but are spaced apart from another. The larger opening 561 is not covered by the rail sections 522, 530 but remains accessible within an open space 569 between the ends of the end rail 522 and the intermediate rail 530. The open space 569 is actually configured to receive one cross support 400 and is designed so that the support rail and the cross support 400 lie in a single plane. The cross support 400 is attached to the rail bracket 550 as by using fasteners that pass through aligned holes in the cross support 400 and in the rail bracket 550. In addition, the larger sized openings 409, 561 are aligned with one another and are not covered.

The rail bracket 550 can be formed of a rigid material, such as a metal or plastic or wood.

It will be appreciated that the front faces of the end sections 562 of the rail bracket receive the rail sections 522, 530 and the front face of the main center section 560 is in contact with the cross support 400 that extends thereacross (within space 569). The rear face of the main center section 560 does not have any of the frame supports in contact therewith; however, as discussed herein, the rear face of the main center section 560 and the side walls 561 thereof can be used as a mount on which an accessory can be mounted (see below).

Figure 36:
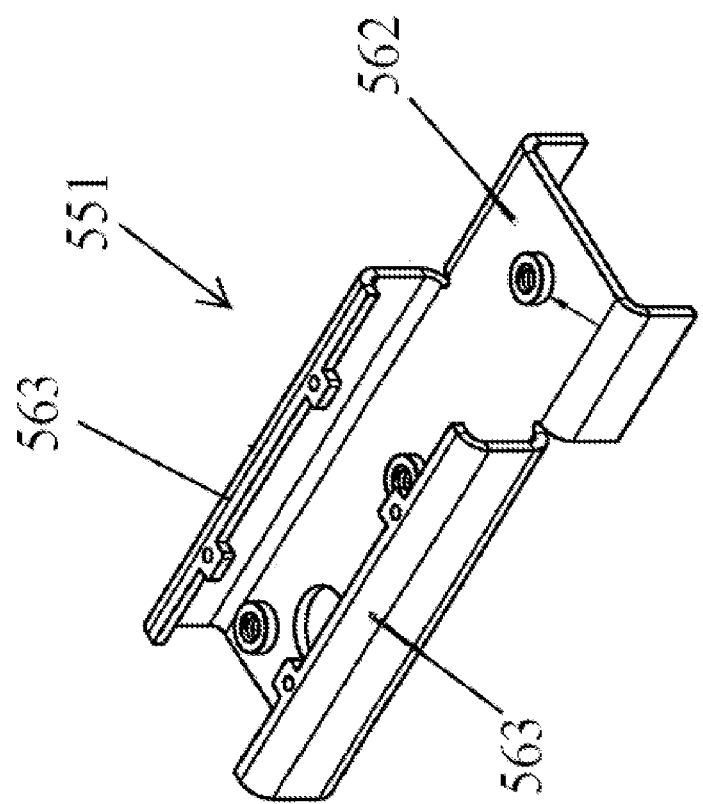
FIG. 36 is a perspective view of a second rail bracket.
Figure 37:
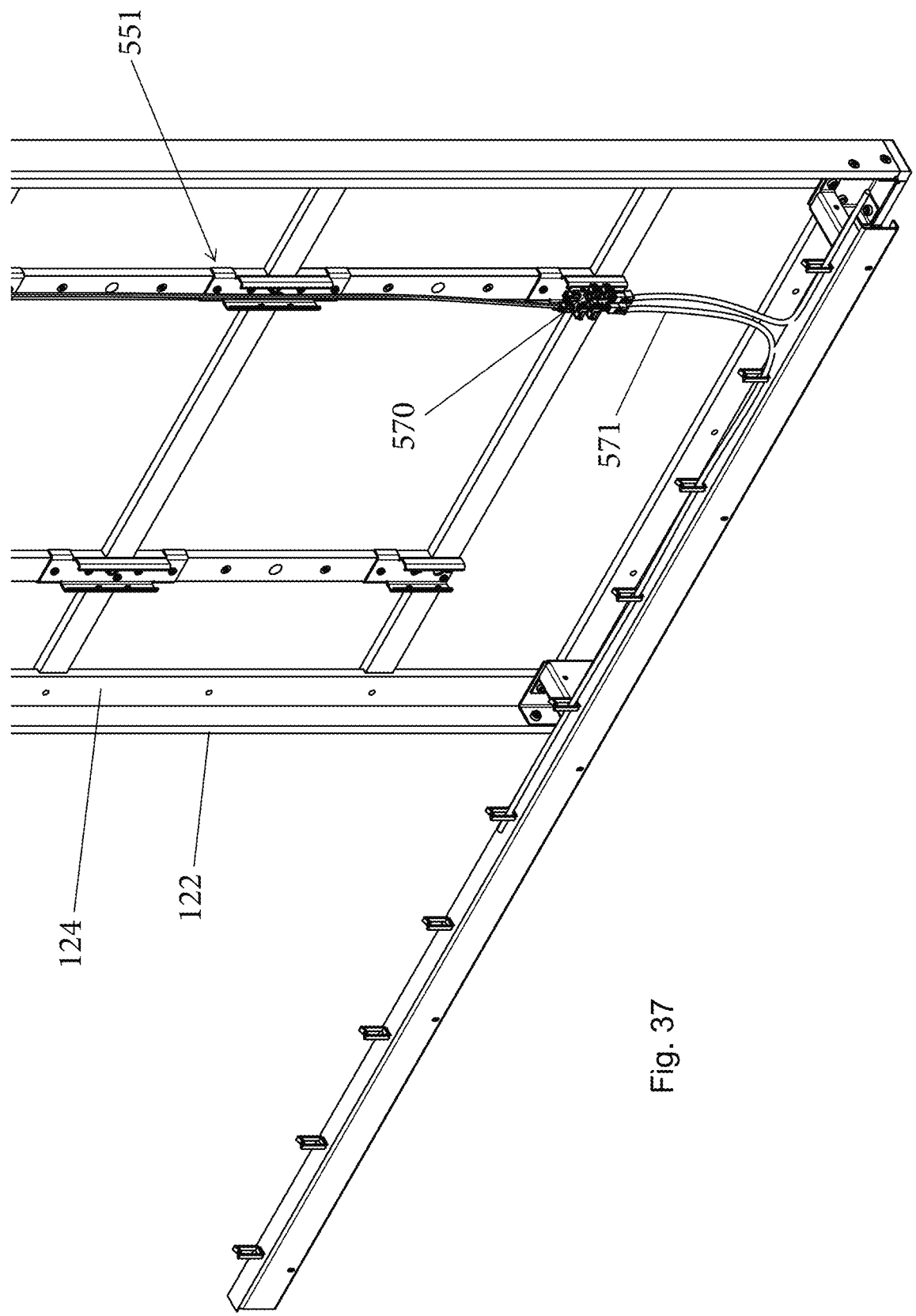
FIG. 37 is a perspective view of the second rail bracket attached to the wall overlay frame assembly.
Figure 38:
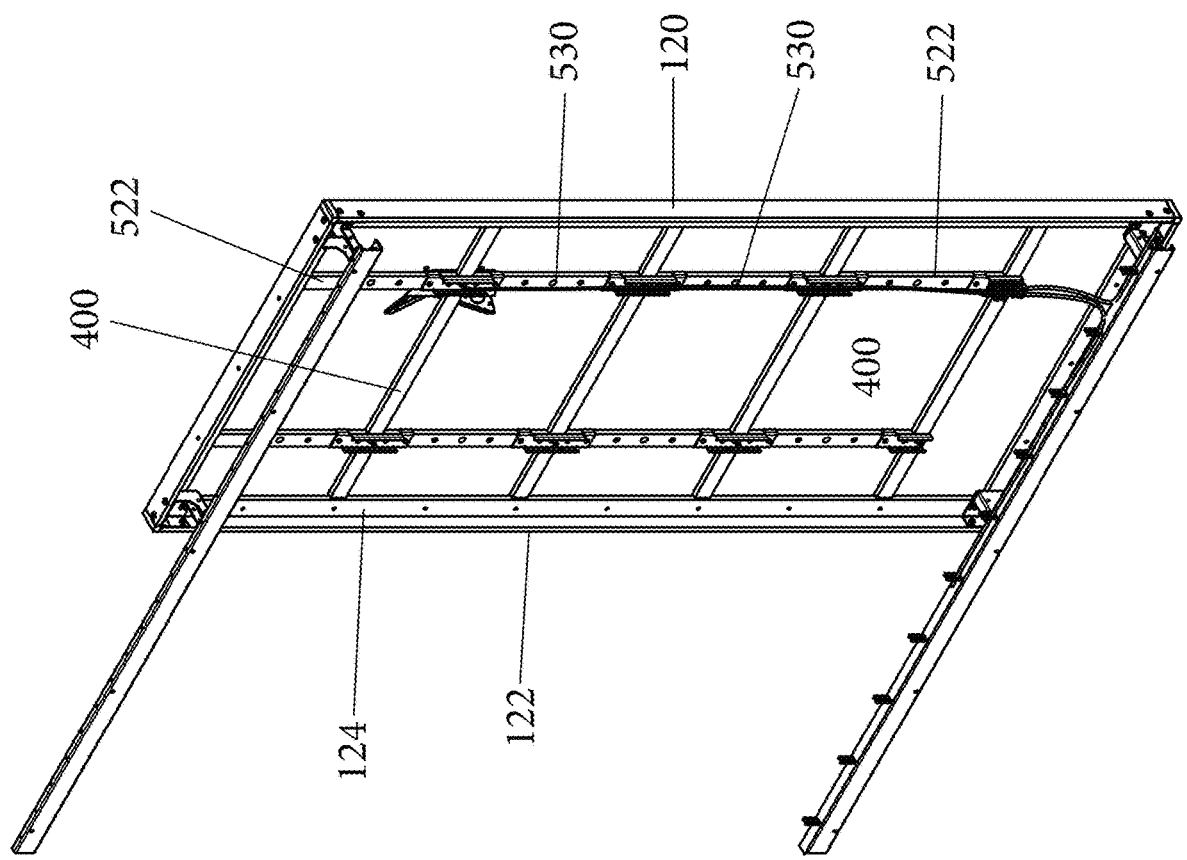
FIG. 38 is a front perspective view of a lighting wall overlay frame assembly with a lighting device detachably coupled thereto.
Figure 46:
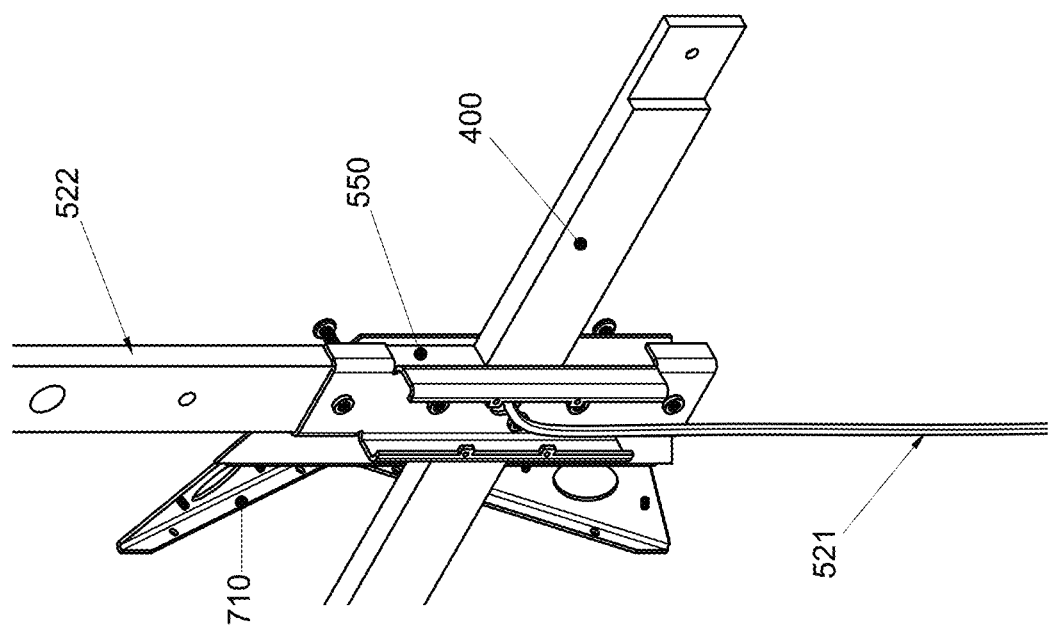
FIG. 46 is a rear perspective view of the lighting device coupled to the lighting wall panel frame assembly.
Figure 45:
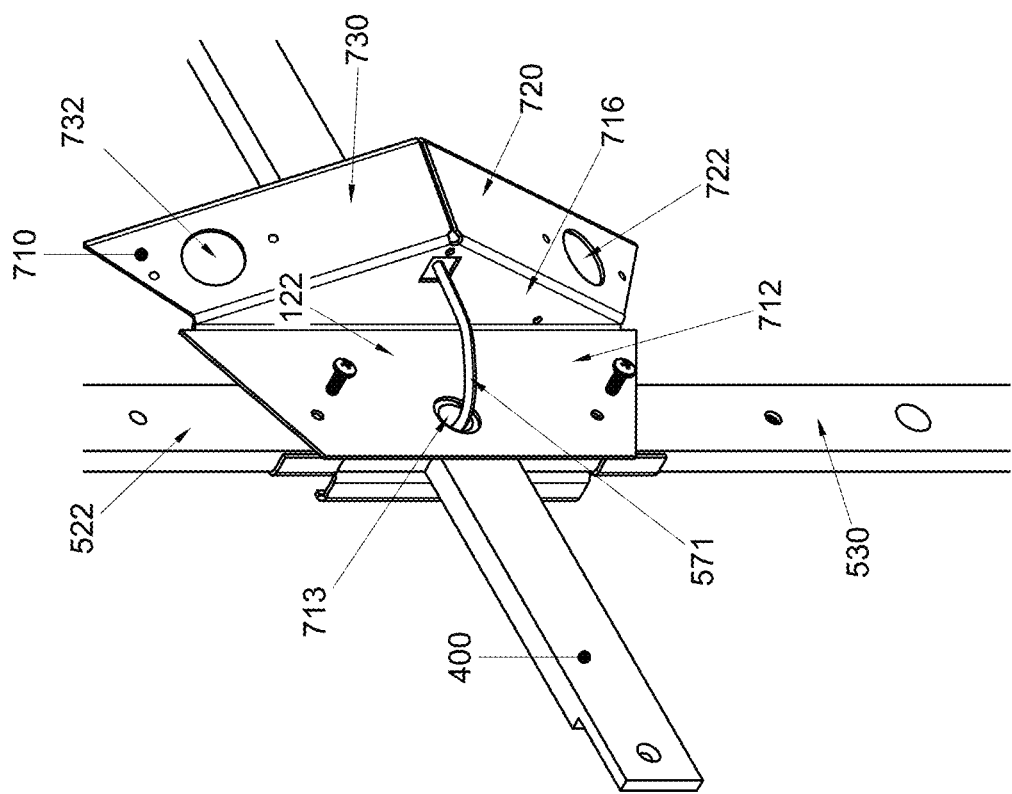
FIG. 45 is a front perspective view of the lighting device coupled to the lighting wall panel frame assembly.

In addition, as shown in FIG. 36, a modified rail bracket 551 which is similar to rail bracket 550 can be formed with only one end section 562 as for use at the ends of the panel grid; while the rail bracket 550 that is used away from the ends of the grid can have two end sections 562. Otherwise, the construction of the brackets 550, 551 is the same and like elements are numbered alike. As with the bracket 550, the bracket 551 provides a mounting surface to mount equipment, such as a PCB 570, as shown in FIG. 37.

In a lighting application, such as the one illustrated and described herein, the grid pattern construction provides a structure for routing the necessary power cables and also for supporting associated electronics. For example, a processor, such as a printed circuit board (PCB) 570, can be provided and is configured to mount to the main center section 560 of the rail bracket 550 and in particular, the PCB 570 is mounted between the side walls 561. In this manner, the PCB 570 is conveniently mounted to the grid at any number of different locations to allow a light accessory to be positioned at said location as described herein. The PCB 570 is connected to wiring 571 that leads to a power source and leads to the light accessory and further can include other electronics, such as switches and the like to allow the light to dim and also the PCB 570 can support a communications module, such as a transmitter and/or receiver, to allow for remote communication and control of the light accessory. For example. Bluetooth and/or WIFI capabilities can be incorporated into the system for controlling the one or more light accessories as well as controlling other features of the panel and/or surrounding equipment. This allows voice recognition technology to also be employed for controlling the light accessories (light fixtures).

As shown, the wiring 571 can be routed along the outer frame 110 and/or the cross support 400.

Wiring for the light accessory which is attached along the front face of the grid, as opposed to the PCB 570, which is attached along the rear face of the grid, passes through the aligned openings 409, 561.

Any number of light accessories can be mounted along the front face of the grid using fasteners or other conventional techniques. One exemplary light accessory in the form of a light fixture is described below.

Figure 29:
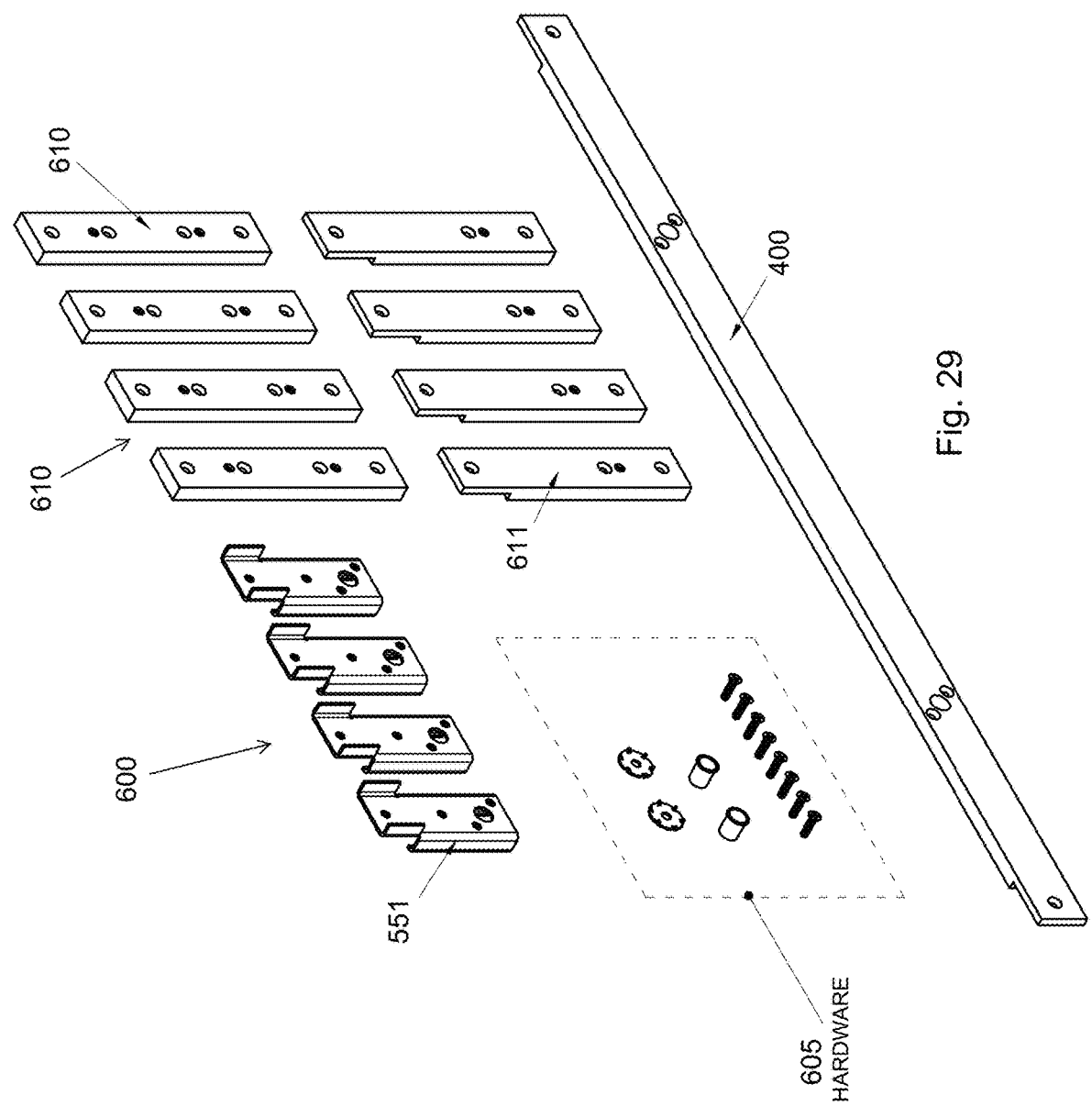
FIG. 29 is a kit showing exemplary parts that can be used to construct the alternative, customizable wall panel frame assembly.
Figure 30:
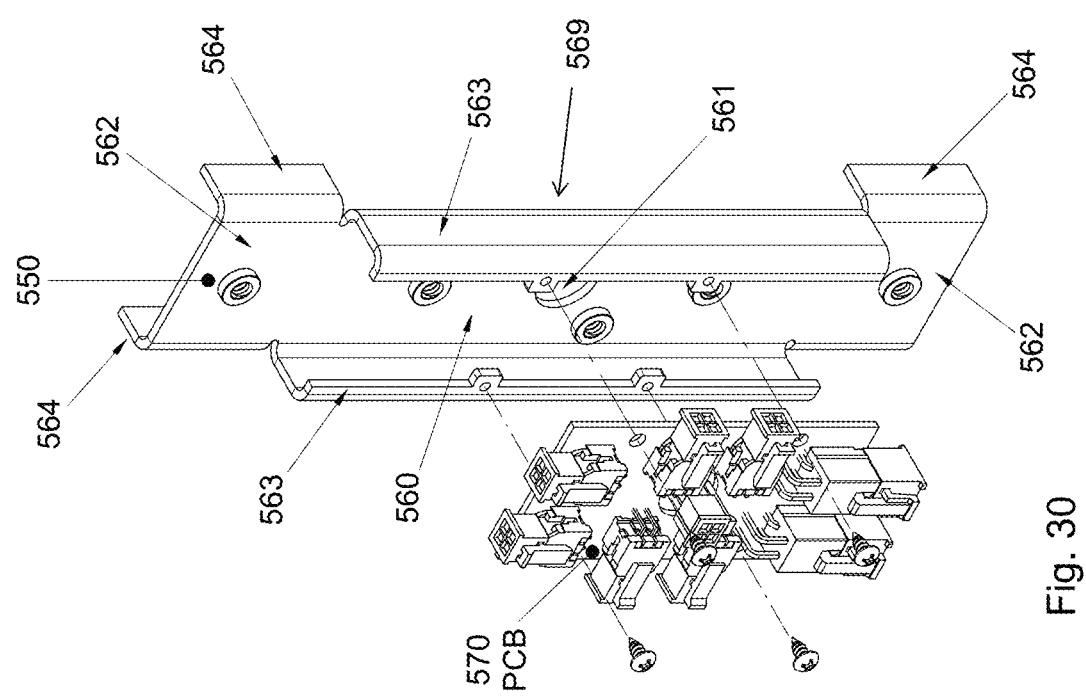
FIG. 30 is an exploded perspective view of a first rail bracket according to a first embodiment.
Figure 34:
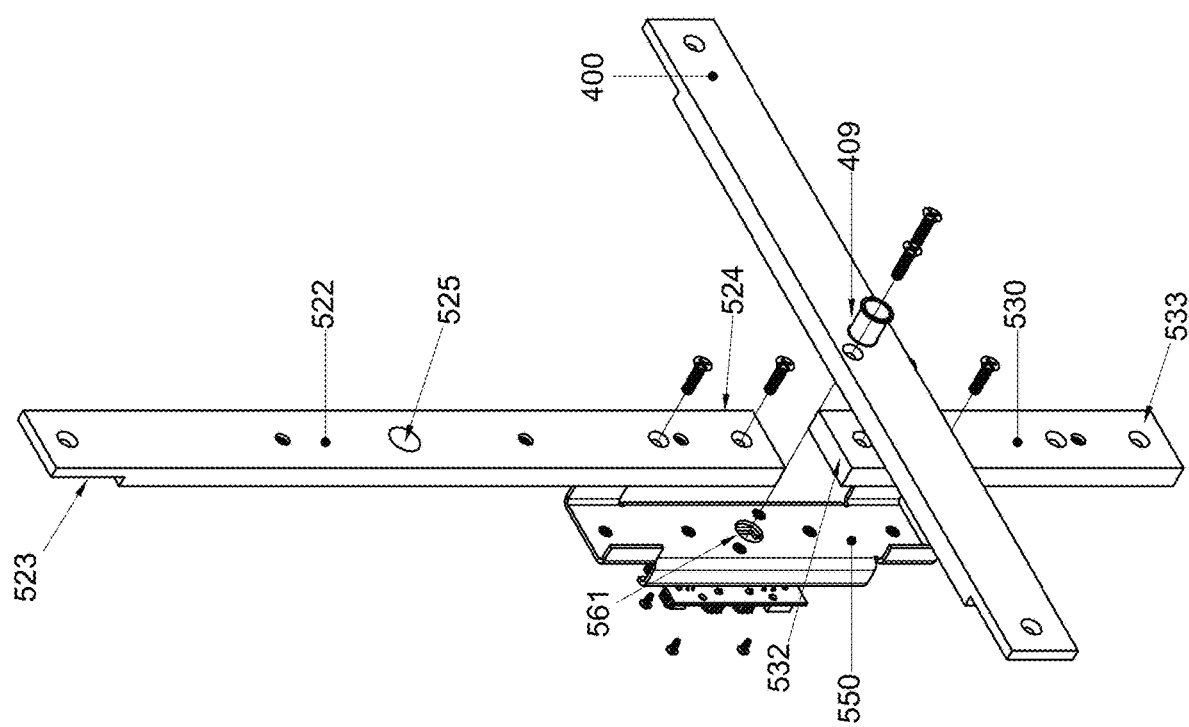
FIG. 34 is an exploded perspective view the first rail bracket and a plurality of rails to which it is attached.
Figure 35:
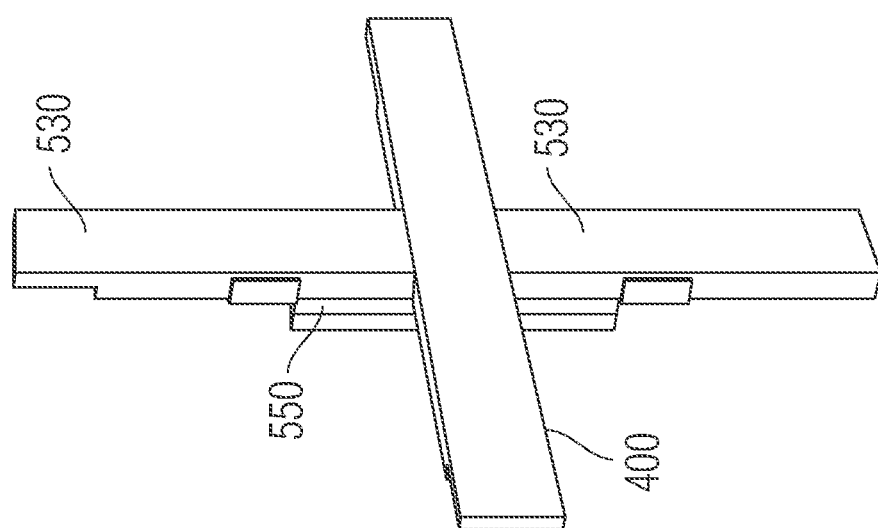
FIG. 35 is a rear perspective view of the first rail bracket and plurality of rails attached thereto.

Variation Kit for Grid Pattern (FIG. 29)

One will appreciate that, when assembled, the cross supports 400 and support rails define the grid pattern and it will further be understood that this grid pattern is highly customizable based on the intended application and features and accessories incorporated into the overlay system. One of the considerations in panel design is the placement of speakers behind the overlay system and at a location where a speaker is to be placed along the support surface (wall) an open space is created in the grid pattern that is sufficiently large enough to receive the speaker. Unlike some home theater speakers that must be recessed relative to the wall on which they are mounted, certain speakers can be mounted flush against the support surface when using the overlay system disclosed herein since the frame 110 of the overlay system 100, 500 is spaced from the support surface, thereby creating a space into which a flush mounted speaker can be received and contained and hidden by the panel.

As shown in FIG. 29, a variation kit 600 can be provided and generally includes all of the components that are required to construct the inner grid pattern for construction internally within the frame 110. Thus, the kit 600 will include various rails that can and often are of different sizes and/or different construction and various brackets that are needed as well as hardware 605, such as fasteners, for assembling the grid pattern.

The variation kit 600 can include a plurality of reduced length inner rails 610 (relative to rail 530) and a plurality of reduced length outer rails 611 (relative to rail 520). In addition, cross supports 400 can be provided in the kit.

Like the end rail 522, the rails 611 are designed to be attached to the end spline 120, the cross support 400 and/or the rail bracket 550, 551, while the rails 610 are intended to be attached to the cross support 400 and/or the rail brackets 550, 551. Any number of different grid patterns can be created by using a combination of longer rails 522, 530, cross supports 400 and reduced length rails 610, 611. As mentioned, the exact grid layout is highly customizable and allows for creation of larger openings into which a speaker or other large piece of AV equipment or acoustic treatment can be disposed.

Lighting Devices

As mentioned, the system 100, 500 is configured such that lighting devices can be detachably connected to the system 100, 500 and in particular, the customizable inner grid pattern that is defined therein.

"Origami" Light Accessory (FIGS. 41-48)

One of the accessories that can be used with customizable modular wall overlay system 500 is a light fixture, such as decorative light fixture 700. The frame 110 is constructed to allow the light fixture to be easily installed at any number of locations along the overlay. More particularly, the inner grid pattern created by the support rails 522, 530, 610, 611 and the cross supports 400 define locations at which the light fixture 700 can be mounted.

The light fixture 700 is connected to the PCB 570 with wire(s) 571 (FIG. 37) for powering and control of the light fixture 700. The light fixture 700 comprises a base 710 and a cover 701 which in one embodiment is readily removable from the base 710 and can be coupled to the base 710 by magnetic coupling or other type of coupling that allows for easy detachment of the cover.

The base 710 has a mounting wall 712 that includes a number of openings for receiving fasteners that allows the attachment of the mounting wall 712 to the rail sections 522, 530. The mounting wall 712 includes a larger sized opening 713 that is axially aligned with the aligned openings 409, 561 to allow the wire 571 to pass therethrough. The mounting wall 712 is thus positioned and mounted flush to the rails 522, 530 or other rails. The mounting wall 712 can be trapezoidal shaped or have another shape. The base 710 also includes an outwardly extending wall 716 that is positioned at angle, such as 90 degrees, relative to the mounting wall 712 and can be formed along one edge of the mounting wall 712. The wall 716 can have a triangular shape (or other shape) and along the two edges of the wall 716 that are spaced from the mounting wall 712, first and second flanges 720, 730 extend outwardly at an angle. The first flange 720 has an opening 722 formed therethrough, while the second flange 730 has an opening 732 formed therethrough. Since the first and second flanges 720, 730 extend along the angled edges of the wall 716, the first and second flanges 720, 730 generally assume a V shape.

The wall 716 also has an opening 719 through which a connector on a PC board mounted to the inside wall 716 can be muted and provides a connection point for wire 571.

Within each of the openings 722, 732, a magnet assembly 800 is disposed (FIG. 44). The magnet assembly 800 consists of a magnet frame 810 that is attached along the inner surfaces of the first and second flanges 720, 730 as by the use of fasteners. The magnet frame 810 carries a magnet 815 that is aligned with and disposed within one of the openings 722, 732 (FIG. 43). The face of the magnet is flush with the outer surface of first and second flanges 720 and 730. Felt or other dampening material is added to the surfaces of the first and second flanges 720, 730 to prevent cover 701 from rattling when cover 701 is in contact with flanges 720, 730 such as when cover 701 is mounted by magnetic attraction.

Within the base 710, another PCB 750 (FIG. 41) is installed against the wall 716 and this PCB 750 carries LEDs or another light source. A bottom cover 760 can be attached as part of the base 710 for closing off the base 710 and concealing the PCB 750. The cover 760 extends between the ends of the first and second flanges 720, 730. The cover 760 includes felt strips that seal any gaps between the cover all the adjacent surfaces. The PCB 750 can have angled sides to fit within the triangular (pyramid) shaped footprint.

The light fixture 700 also has a diffusion lens 775 that is also generally triangular shaped and seats against the flanges 720, 730 to seal the unit (light fixture) and openings are used to receive fasteners that attach the diffusion lens 775 to the flanges 720, 730. Felt (or other dampening material) is used between the flanges 720, 730 and the face of the diffusion lens 775 to prevent light leakage and rattles. The light from the LEDs is directed through the diffusion lens 775 to provide soft diffused light. When the overlay system 500 is mounted vertically, the fixture is oriented such that light diffuses in a lateral direction (either towards the right or left side of the panel).

The cover 701 can be generally V-shaped and is formed of a non-ferrous material (aluminum, plastic, foam, etc.) that allows the cover 701 to be detachably coupled to the base 710 using precisely position ferrous (steel) washers 900 and 901 that are located right over the magnets 815. Washers 900, 901 are secured to the inside of cover 701 using die-cut double-sided tape discs. Cover 701 has center marks added to the inside of the cover during manufacturing to act as locating marks for the center of washer 900, 901. Since washers 900, 901 have a hole in their centers, the locating mark can be used to precisely locate washers 900, 901.

The angle of the cover 701 matches the angle of flanges 720 and 730 which allows for the cover 701 to be seated flush against the magnets 815 that are exposed along the rust and second flanges 720, 730. The angled construction of the cover 701 make positioning of the cover 701 on the base 710 very easy since washers 900, 901 are attracted to the center of magnet 815, forcing the proper alignment.

The light fixture 700 can be mounted in one of two ways relative to the panel 500. The base 710 can be oriented in either a left facing direction or a right facing direction depending upon the direction in which the base 710 is facing. If the diffusion lens 775 faces right, then light is diffused to the right; whereas, if the diffusion lens 775 faces left, then the light is diffused to the left. This versatility allows the light fixture to be placed at any number of locations and facing in either direction so as to allow many different light features to be formed.

To attach the light fixture 700 to the frame, small holes are cut or punched in the cover 200 to allow for passage of the fasteners and wiring. A plastic bushing is pressed into the larger hole after cutting the fabric immediately over the hole. This bushing trims the hole and retains the cut ends of the fabric by forcing the cut ends of the fabric into the hole, alongside the outer diameter of the tubular bushing.

The light fixture 700 is thus mounted along the outer face of the cover 200.

Acoustic Treatment 17, 910 (FIG. 2)

In home theater design and design of similar spaces, acoustic treatment (e.g. an acoustic treatment (sound absorbing) panel) is often used. In particular, once a room is already constructed, acoustic treatment mostly tends to consist of treating the surfaces. There are two primary elements to consider; namely, absorption and diffusion. Acoustic foam is well suited to alleviate slap and flutter echo, the two most common problems in rooms not specifically designed for music recording and performance. In fact, foam can turn even the most cavernous warehouse or gymnasium into a suitable acoustic environment. Diffusion keeps sound waves from grouping, so there are no hot spots or nulls in a room. Any number of suitable sound absorbing materials can be used including but not limited to: foam, fiberglass-based products, etc., that are able to absorb sound reflections. Diffusers work by scattering reflections so cannot become additive and the natural tone is preserved.

In one implementation, the modular wall overlay systems 100, 500 described herein contain and/or cover acoustic treatment material (sound absorbing material and/or diffusers) 910. It will be appreciated that the acoustic treatment material 910 can be used by itself or in combination with a speaker. For example, as shown in FIG. 2, a wall mounted speaker can have one or more blocks of acoustic treatment material 910 around the speaker with both the speaker and the acoustic treatment material 910 being covered by the modular wall overlay system 100, 500. Alternatively, the modular wall overlay systems 100, 500 can be used to only cover one or more blocks of acoustic treatment material 910 that is disposed along the wall.

Traditionally, the acoustic treatment material was directly secured to the wall itself; however, with the advantageous design of the modular wall overlay system 100, 500, the acoustic treatment material 910 can be instead coupled to the modular wall overlay systems 100, 500 itself. More particularly, the acoustic treatment material 910 can be coupled to any of the structural components of the modular wall overlay system 100, 500 including the outer frame components and/or the inner frame components. In addition, the coupling between the acoustic treatment material 910 to the modular wall overlay system 100, 500 can be of a fixed nature or it can be of a detachable type.

For example, one or more blocks of acoustic treatment material 910 can be coupled to the inner frame components (inner grid pattern), such as one or more of the cross supports 400. The coupling can be of a detachable nature in that one or more fasteners (not shown) can be used to detachably couple the acoustic treatment material 910 to the cross support 400. For example, the fastener can be in the form of a hook and loop material, such as a strap, that attached to a complementary hook and loop material, such as a pad, that is attached to the cross support 400. Two opposing fasteners can be used for detachably attaching the panel of acoustic treatment material 910 between two cross supports 400. The use of hook and loop material or other types of fasteners, allows for easy removal, replacement and/or repositioning of the acoustic treatment material 910. For example, the cross supports 400 can contain pads of hook and loop material to allow for positioning of the acoustic treatment material 910 at any number of different locations.

Unlike traditional setups in which the acoustic treatment material 910 is attached directly to the wall, the acoustic treatment material 910 is carried and supported by the modular wall overlay system 100, 500. This allows for easy construction and transportation of the assembled panel along with the acoustic treatment material 910.

It will be appreciated that the acoustic treatment material 910 can come in any number of different sizes and/or shapes.

Instead of use of straps, one side edge of the acoustic treatment material 910 can contain a fastener component (e.g., strip of hook and loop material) and the side edge of the cross support 400 can contain a mating fastener components (e.g., one or more pads of hook and loop material).

In this way, the acoustic treatment material 910 is contained internally within the modular wall overlay system 100, 500 beneath the fabric cover out of sight.

As mentioned, the modular wall overlay system 100, 500 can cover one or more wall mounted speakers with surrounding acoustic treatment material and/or can just cover one or more blocks of acoustic treatment material without a speaker. In any of these arrangements, the modular wall overlay system 100, 500 provides a system for covering the working, necessary acoustic components in a home theater in an aesthetically please manner.

Given the modular aspect of the modular wall overlay system 100, 500, if the homeowner moves, the system is constructed such that it can easily be removed from the room and then potentially reinstalled at a new location.

The present disclosure is thus directed to a modular panel overlay system for an entertainment space. The modularity allows for the panel to be customized based on particular needs of a customer and in view of the installation space itself. Not only can AV devices that are wall mounted by concealed, the outer face of the panel defined by the cover can be customized and offers an attractive element to any space. Any number of different colors, text, graphical patterns, textures, etc. can be imparted to the cover. The beauty of the present system is that the cover can easily be removed from the panel frame to allow not only cleaning but switching of the cover to alter the panel appearance. In the event that a speaker is not place behind the panel, this space behind the panel is an acoustically treated space.

It will also be appreciated that while the modular wall overlay system 100, 500 is described as being part of an audio/visual experience (e.g., home theater), the technology described herein has other applications outside this space. For example, the fabric cover 200 that is coupled to and carried by the frame in a tensioned state can be in the form of an artist's canvas on which a painting or the like is depicted. The wall mounting system described herein is very simple in construction yet effective and would allow a stretched canvas on the frame using the tensioning mechanism described herein to be displayed on said wall but be readily removable. Unlike conventional stretcher frames in which the canvas is tacked (stapled) to the frame (wooden frame), the canvas (i.e., like fabric cover 200) would not be physically and fixedly attached to the underlying frame but instead is held thereon using the tensioning mechanism. In this way, the canvas is preserved and no holes are formed therethrough as would be the case when using staples. Other types of art or commercial displays (advertisements, etc.) can equally be applied to and held on the frame disclosed herein as a result of the tensioning mechanism. In corporate setting, such as a board room, it will be appreciated that the fabric cover 200 can include corporate indicia, such as a logo or the like.

The fabric cover 200 can also be of a light reflective fabric that acts as a projection screen, thereby allowing the panel 110 to become a surface for displaying projected video from one or more projectors mounted on the ceiling of the room.

It will also be appreciated that any number of other objects may be mounted to the frame described herein. While electronics and acoustic treatment material have been mentioned, small speakers can be mounted to the frame itself. In addition, other elements can be equally mounted to the frame or components associated therewith.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. A modular wall overlay system for installation on a support surface comprising:
    an outer frame having a pair of opposing ends and a pair of opposing sides;
    a customizable inner frame that is coupled to the outer frame, the inner frame including a plurality of transverse supports that extend between the opposing sides and a plurality of longitudinal supports that extend between the opposing ends, wherein the longitudinal supports and the transverse supports lie in a common plane defined within the outer frame in that front faces of the longitudinal supports and the transverse supports are flush and lie in the common plane; and
    a cover securely retained on the outer frame;
    wherein each longitudinal support is formed of a pair of end rails and one or more intermediate rails with a plurality of inner brackets attached to the pair of end rails and the one or more intermediate rails, each bracket having a first face to which one end rail and one intermediate rail is attached in spaced relationship with one respective transverse support extending across the first face between the one end rail and the one intermediate rail, wherein each bracket include outwardly extending first side tabs that define a space in which the one end rail is disposed with the first side tabs being disposed along the side edges of the one end rail;
    wherein the bracket has an opposite second face which faces rearward and is configured to receive an electronic device, wherein each bracket along the second face has outwardly extending second side tabs.

2. The modular wall overlay system of claim 1, further including a tensioning system that detachably retains the cover on the outer frame without direct attachment of the cover to the outer frame but rather is retained under tension on the frame by the tensioning system.

3. The modular wall overlay system of claim 2, wherein the cover comprises a main portion and discrete edge pocket sections that are not continuous to one another so as to form an open corner and the tensioning system comprises a cable that is routed though the edge pocket sections and is tightened with a turnbuckle.

4. The modular wall overlay system of claim 3, wherein the tensioning system includes a plurality of pulleys that are located along sides of the frame, the cable being routed along and wrapped around the pulleys to tension and pull the cable inward at the discrete locations of the pulleys.

5. The modular wall overlay system of claim 1, wherein the outer frame includes a plurality of outer frame pieces and a plurality of corner brackets, the outer frame pieces being directly coupled to respective corner brackets but are free of direct coupling to one another.

6. The modular wall overlay system of claim 5, wherein each outer frame piece comprises an elongated outer frame wall and a spline that is fixedly coupled to the outer frame wall and protrudes outwardly from one face of the outer frame wall, wherein the spline is formed at a 90-degree angle relative to the outer frame wall but is off-centered along the one face.

7. The modular wall overlay system of claim 6, wherein ends of the longitudinal support have stepped constructions including areas of reduced thickness that are disposed over respective splines and ends of the transverse support have stepped constructions including areas of reduced thickness that are disposed over respective splines.

8. The modular wall overlay system of claim 5, further including a plurality of corner inserts that are disposed in each corner of the frame between ends of the frame pieces to complete corners of the frame.

9. The modular wall overlay system of claim 8, wherein the corner insert is formed of an elastic material.

10. The modular wall overlay system of claim 1, wherein the electronic device comprises a printed circuit board.

11. The modular wall overlay system of claim 1, wherein the bracket includes at least one first through hole for allowing passage of wires from the second face to the first face.

12. A modular wall overlay system for installation on a support surface comprising:
    an outer frame having a pair of opposing ends and a pair of opposing sides;
    a customizable inner frame that is coupled to the outer frame, the inner frame including a plurality of transverse supports that extend between the opposing sides and a plurality of longitudinal supports that extend between the opposing ends, wherein the longitudinal supports and the transverse supports lie in a common plane defined within the outer frame; and
    a cover securely retained on the outer frame;
    wherein the outer frame includes a plurality of outer frame pieces and a plurality of corner brackets, the outer frame pieces being directly coupled to respective corner brackets but are free of direct coupling to one another;
    wherein the corner bracket includes an outwardly extending post which supports a magnet at a distal end thereof, the post being located at an inner corner of the corner bracket.

13. The modular wall overlay system of claim 12, wherein a distance from the magnet to a front face of the frame is adjustable.

14. A modular wall overlay system for installation on a support surface comprising:
- an outer frame having a pair of opposing ends and a pair of opposing sides;
- a customizable inner frame that is coupled to the outer frame, the inner frame including a plurality of transverse supports that extend between the opposing sides and a plurality of longitudinal supports that extend between the opposing ends, wherein the longitudinal supports and the transverse supports lie in a common plane defined within the outer frame;
- a cover securely retained on the outer frame; and
- a light fixture that includes a base that is disposed over the first face of the bracket and a cover that is detachably coupled to the base;
- wherein each longitudinal support is formed of a pair of end rails and one or more intermediate rails with a plurality of inner brackets attached to the pair of end rails and the one or more intermediate rails, each bracket having a first face to which one end rail and one intermediate rail is attached in spaced relationship with one respective transverse support extending across the first face between the one end rail and the one intermediate rail;
- wherein the bracket has an opposite second face which faces rearward and is configured to receive an electronic device;
- wherein the bracket includes at least one first through hole for allowing passage of wires from the second face to the first face.

15. The modular wall overlay system of claim 14, wherein the base includes a second through hole that is aligned with the first through hole.

16. The modular wall overlay system of claim 14, wherein the cover is detachably coupled to the base by magnetic attraction between the cover and the base.

17. The modular wall overlay system of claim 14, wherein the cover is V-shaped defined by a first section and a second section that meet at a common linear seam, each of the first section and the second section having one of a magnet and a ferrous element, the base having a pair of angled flanges that meet at a common seam, the first and second sections of the cover seating flush against the pair of angled flanges.

18. The modular wall overlay system of claim 17, wherein each of the angled flanges has an opening that receives a magnet assembly that includes a magnet frame that is coupled to one respective flange and carries the magnet such that the magnet is flush with or below an outer surface of the angled flange.

19. The modular wall overlay system of claim 14, wherein the base of the light fixture includes a diffusion lens and a printed circuit board.

20. A modular wall overlay system for installation on a support surface comprising:
- an outer frame having a pair of opposing ends and a pair of opposing sides;
- a customizable inner frame that is coupled to the outer frame, the inner frame including a plurality of transverse supports that extend between the opposing sides and a plurality of longitudinal supports that extend between the opposing ends; wherein each longitudinal support is formed of a pair of end rails and one or more intermediate rails with a plurality of inner brackets attached to the pair of end rails and the one or more intermediate rails, each bracket having a first face to which one end rail and one intermediate rail is attached in spaced relationship with one respective transverse support extending across the first face between the one end rail and the one intermediate rail;
- a first printed circuit board that is disposed along a second face of the bracket; and
- a light fixture that includes a base that is disposed over the first face of the bracket and a cover that is detachably coupled to the base, wherein the first printed circuit board and the light fixture are electrically connected through overlapping openings formed in the bracket and the base of the light fixture.

21. The modular wall overlay system of claim 20, wherein the cover is detachably coupled to the base by magnetic attraction between the cover and the base.

22. The modular wall overlay system of claim 20, wherein the cover is V-shaped defined by a first section and a second section that meet at a common linear seam, each of the first section and the second section having one of a magnet and a ferrous element, the base having a pair of angled flanges that meet at a common seam, the first and second sections of the cover seating flush against the pair of angled flanges.

23. The modular wall overlay system of claim 22, wherein each of the angled flanges has an opening that receives a magnet assembly that includes a magnet frame that is coupled to one respective flange and carries the magnet such that the magnet is flush with or below an outer surface of the angled flange.

* * * * *